(12) United States Patent
Hauser et al.

(10) Patent No.: US 11,580,842 B1
(45) Date of Patent: Feb. 14, 2023

(54) REAL-TIME ALERT MANAGEMENT USING MACHINE LEARNING

(71) Applicant: ADAPDIX CORPORATION, Pleasanton, CA (US)

(72) Inventors: Steven Hauser, Lancaster, PA (US); Anthony Hill, Danville, CA (US)

(73) Assignee: ADAPDIX CORPORATION, Pleasanton, CA (US)

( * ) Notice: Subject to any disclaimer, the term of this patent is extended or adjusted under 35 U.S.C. 154(b) by 0 days.

(21) Appl. No.: 17/548,522

(22) Filed: Dec. 11, 2021

(51) Int. Cl.
*G08B 21/00* (2006.01)
*G08B 21/18* (2006.01)
*G06N 20/20* (2019.01)
*G08B 31/00* (2006.01)

(52) U.S. Cl.
CPC .......... *G08B 21/182* (2013.01); *G06N 20/20* (2019.01); *G08B 31/00* (2013.01)

(58) Field of Classification Search
CPC ....... G08B 21/182; G08B 31/00; G06N 20/20
See application file for complete search history.

(56) References Cited

U.S. PATENT DOCUMENTS

| | | | | |
|---|---|---|---|---|
| 11,303,666 B1 * | 4/2022 | Peters | ..................... | G06N 5/022 |
| 11,449,084 B1 * | 9/2022 | Taylor | ..................... | G05D 22/02 |
| 2019/0370610 A1 * | 12/2019 | Batoukov | .......... | G06K 9/00523 |
| 2021/0079890 A1 * | 3/2021 | Zhang | ..................... | F03D 80/50 |
| 2021/0103580 A1 * | 4/2021 | Schierz | ................ | G06F 16/2365 |
| 2021/0303934 A1 * | 9/2021 | Ernest | .................. | G06K 9/6271 |
| 2022/0014422 A1 * | 1/2022 | Gupta Hyde | ........... | H04L 43/20 |
| 2022/0016480 A1 * | 1/2022 | Bissonnette | ........... | G06N 20/20 |
| 2022/0065748 A1 * | 3/2022 | Nair | ..................... | G01M 13/045 |
| 2022/0238216 A1 * | 7/2022 | Shelton, IV | ............. | G06F 8/658 |
| 2022/0249906 A1 * | 8/2022 | Phillips | ................ | G06N 3/0472 |
| 2022/0253647 A1 * | 8/2022 | Perkins | ................ | G06K 9/6257 |
| 2022/0294715 A1 * | 9/2022 | Agrawal | .................. | G06N 3/04 |
| 2022/0303291 A1 * | 9/2022 | Baldini Das Neves | ..................... H04L 63/1416 | |

* cited by examiner

*Primary Examiner* — Ojiako K Nwugo
(74) *Attorney, Agent, or Firm* — Maschoff Brennan

(57) ABSTRACT

Embodiments for managing real-time alerts using machine learning are disclosed. For example, a method includes receiving real-time data for one or more parameters of a device for which an alert is to be generated, from one or more sources associated with the device, and selecting a first machine learning model from a plurality of machine learning models based on the received real-time data. The method further includes determining at least one anomaly in the device based on the selected first machine learning model and predicting an impact of the determined at least one anomaly based on a second machine learning model of the plurality of machine learning models. Furthermore, the method includes generating the alert for the device in real-time based on the predicted impact of the determined at least one anomaly and receiving feedback on the generated alert in real-time.

20 Claims, 6 Drawing Sheets

US 11,580,842 B1

REAL-TIME ALERT MANAGEMENT USING MACHINE LEARNING

FIELD OF THE INVENTION

The embodiments discussed in the present disclosure are generally related to low latency alert lifecycle management and escalation systems using machine learning. In particular, the embodiments discussed are related to real-time intelligent and automated alert lifecycle management using machine learning.

BACKGROUND OF THE INVENTION

Alarm systems with monitoring of one or more parameters of a device or an edge device, seeing deviations from some predefined rules and raising a visual, audio, vibrational, or any other alarm are generally known in the industry. Alarms can also be classified into operational, safety, critical, or any such category. Alarms or alerts are important and facilitate process safety, ensure efficient operations, and support to maintain product quality. Alarm management has been broadly implemented in many process industries over the past 20 to 30 years. Predefined alarms, classifications, and alarm management procedures do offer initial efficiency improvements. However, edge processes, device conditions, and device calibrations change over time and require constant manual maintenance and updating of alarm management rules and classifications. Change in raw materials or parts, new environmental or safety regulations, contextual changes surrounding a device, safety, or costly production incidents, etc., require constant manual intervention and updates to an alarm management system.

Alarm management and update is a never-ending process. As well, with current sophisticated robotic and high precision devices, there may be so many variables, some external and contextual, involved that many correlating variables are overlooked from consideration when determining and issuing an effective alarm. As a result, by the time the current alarm management systems analyze the data and issue an alarm, it is too late, and several costly defective products have been produced, or some expensive equipment has been damaged, or someone's life has been put in danger, or some serious environmental violations have occurred. Current alarm management systems are reactive, monitor only internal parameters, and are prone to latency problems.

It is common to manufacture/produce items as fast as possible and maximize Units Per Hour (UPH) production during manufacturing. In practice, however, as the UPH increases, the yield of non-defective items falls as the number of manufactured items rises. The problem is further exacerbated by the fact that similar types of devices are tuned to the lowest yield producing setting, regardless of their state and environment. In the art, it is important to achieve the best UPH from a device without affecting the yield. In addition, the device needs to be tuned individually by taking all relevant factors into account.

An alarm or alert flood has been defined by ANSI/ISA 18.2 as being 10 or more annunciated alarms in any 10-minute period per operator. The US Chemical Safety Board (CSB) cites alarm floods as being a significant contributing cause to industrial incidents. In incidents such as in Three Mile Island, Bhopal, and Texaco Milford Haven, a whole slew of alarms was raised at once and masked the main alarm and the underlying root causes. Until the flood of alarms is cleared, the operators are blinded about what is going on and if some critical safety alarm gets issued during the alarm flood, it would be missed. Therefore, an alarm management system that may control alarm floods under all operating conditions is required.

It has been traditional for an equipment operator to receive an alert when a device part misbehaves and optionally to be notified if it's critical. Upon receiving the alert, there is a tendency to address an anomaly immediately or during the next scheduled maintenance window. Many times, the anomaly or the device part misbehavior is not significant enough to stop operations. Accordingly, the art has a need to categorize and mark alerts likewise.

There is a need in the art not only for improved systems and methods for Intelligent and Automated Edge Alert Life Cycle Management but also for Intelligent Work Permit Management associated with resolving the alert. In view of at least the above-mentioned issues, there is a need in the art for improved systems and methods for real-time intelligent and automated alert lifecycle management using machine learning.

SUMMARY OF THE INVENTION

Embodiments for real-time intelligent and automated alert lifecycle management using machine learning are disclosed that address at least some of the above-mentioned challenges and issues.

In accordance with the embodiments of this disclosure, a method is disclosed. In particular, a method for managing real-time alerts using machine learning are disclosed. The method includes receiving real-time data for one or more parameters of a device for which an alert is to be generated, from one or more sources associated with the device, and selecting a first machine learning model from a plurality of machine learning models based on the received real-time data. The method further includes determining at least one anomaly in the device based on the selected first machine learning model and predicting an impact of the determined at least one anomaly based on a second machine learning model of the plurality of machine learning models. Furthermore, the method includes generating the alert for the device in real-time based on the predicted impact of the determined at least one anomaly and receiving feedback on the generated alert in real-time. The first machine learning model and the second machine learning model are trained in real-time based on the received feedback.

In accordance with the embodiments of this disclosure, a system to manage real-time alerts using machine learning is disclosed. The system comprises a computing device configured to receive real-time data for one or more parameters of a device for which an alert is to be generated, from one or more sources associated with the device, and select a first machine learning model from a plurality of machine learning models based on the received real-time data. The computing device of the system according to the present embodiment of the disclosure is further configured to determine at least one anomaly in the device based on the selected first machine learning model and predict an impact of the determined at least one anomaly based on a second machine learning model of the plurality of machine learning models. Furthermore, the computing device of the system according to the present embodiment of the disclosure is also configured to generate the alert for the device in real-time based on the predicted impact of the determined at least one anomaly and receive feedback on the generated alert in real-time. The first machine learning model and the second machine learning model is trained in real-time based on the received feedback.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
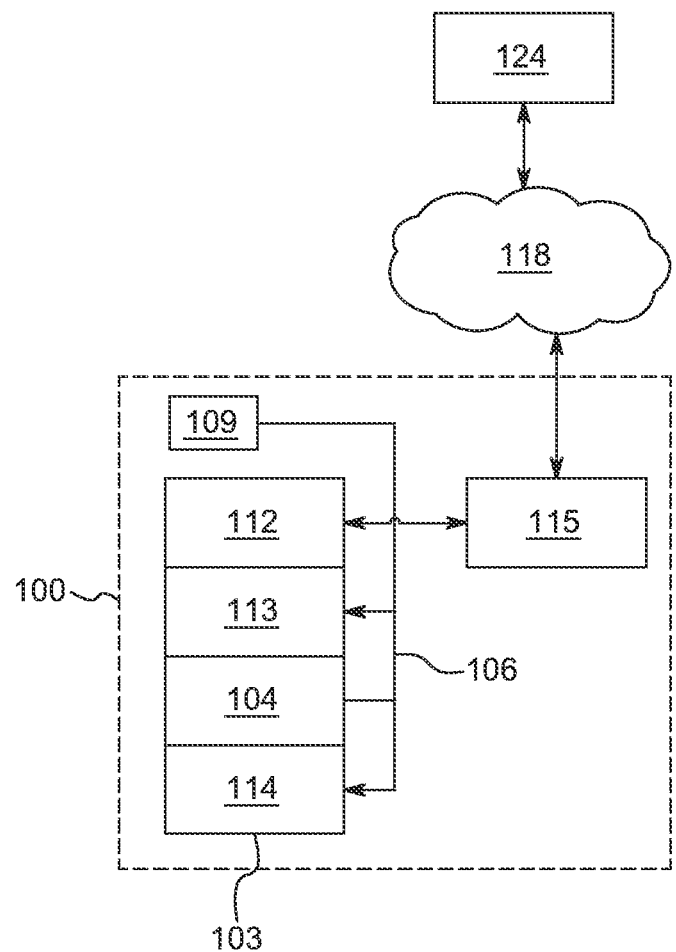
FIG. 1 illustrates an example machine learning based real-time intelligent and automated alert lifecycle management in accordance with the embodiments of the present disclosure.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

The disclosed solution/architecture provides a mechanism for generating real-time intelligent and automated edge alerts with life cycle management using machine learning. Further aspects relate to a predictive, ultra-low latency, edge, anomaly detection and alarm management system that learns and self corrects and presents effective alarms. Still further aspects relate to an alarm management system that may control alarm floods under all operating conditions, and use machine learning to categorize, filter out, and prioritize the most important alarms, in real time, with significant safety, environmental, or business impact and present those selected alarms to the operator. Further aspects relate to grouping, suppressing, and batch processing of alarms, preferably using machine learning, and in real-time, at the edge, close to the source of data utilized to generate the alarms. These and other aspects are discussed below in relation to illustrative embodiments, which serve to provide the reader with an understanding of the various aspects but do not limit this overall disclosure.

In an embodiment of the present disclosure, all the disparate data sources are taken into account to train machine learning models using techniques such as, Dynamic Time Warping (DTW), Frequency Domain Analysis, Time Domain Analysis, Deep Learning, Fuzzy Analysis, Artificial Neural Network Analysis, Xgboost, Random Forest, Support Vector Machine (SVM) Analysis, etc. The machine learning model training may happen at the edge, close to the data source, in the cloud, or on any remote computer to find anomalies and set proper alerts for the operator associated with said anomalies. In certain embodiments, the mathematical representation of the machine learning model training details is stored in memory close to the source of input data. Disparate relevant data streams are fed in memory to the machine learning runtime engine running on a computer close to the data source to get low latency inferencing. In certain embodiments, inferencing from machine learning models happens in real-time at ultra-low frequency of 5 to 30 microseconds, and alerts are generated and presented in similar ultra-low latency at the edge. In certain embodiments, proper baselines are created for normal behavior and anomalies are determined by deviations from the anomalies and alerts are sent to appropriate personnel in real time.

Aspects of the embodiments may be provided in a non-transitory computer-readable medium having computer-executable instructions to perform one or more of the process steps described herein. Other details and features will also be described in the sections that follow certain features and variations thereof.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data/traffic via the established communication paths. In accordance with the embodiments of the present disclosure, the network may include, but are not limited to, the Internet, a local area network (LAN), a wide area network (WAN), and/or a wireless network. Further, in accordance with the embodiments of the present disclosure, the network may comprise, but is not limited to, copper transmission cables, optical transmission fibers, wireless transmission, routers, firewalls, switches, gateway computers, and/or edge servers.

A "device" may refer to an apparatus using electrical, mechanical, thermal, etc., power and having several parts, each with a definite function and together performing a particular task. The device can be any equipment such as a robotic equipment, pick and place equipment, die attach equipment, garbage sorting equipment, automated precision die bonder, optical inspection equipment, compute instances in a data center, etc.

The term "device" in some embodiments, may be referred to as equipment or machine without departing from the scope of the ongoing description.

The term "sensors" may refer to a device, module, machine, or subsystem whose purpose is to detect events or changes in its environment, and send the information to other electronics, frequently a computer processor. As such, a sensor may be a device that measures physical input from its environment and converts it into data that may be interpreted by either a human or a machine. Most sensors are electronic and convert the physical input from its environment into electronic data for further interpretation. In accordance with the embodiments of the present disclosure, sensors may be coupled to, or mounted on to the device, and may provide real-time measurements of the conditions of the device during its operation.

The device may have "internal sensors," which are physically attached to the device and help with proper functioning of the device. Internal sensors may be used for measuring motion, pressure, axis position, acceleration, rotation, tilt, temperature, vibrations, humidity, etc. These internal sensors may be connected in a wired or wireless way to device's Data Acquisition System (DAQ) or its Programmable Logic Controller (PLC) or any other data acquisition or control system.

Measurement of conditions on the device may be supplemented with "external sensors." These external sensors, such as Bosch XDK sensor, etc., may measure motion, vibrations, acceleration, temperature, humidity, etc., and may provide sensing of additional parameters that may be missed by the internal sensors.

The term "Data Acquisition System (DAQ)" may be defined as a system that samples signals from internal sensors/external sensors and converts them into digital form that may be manipulated by a computer and software. DAQ system takes signals from the internal sensors/external sensors, condition the signals, do the analog to digital conversion, and make the digital signals available for further use.

The term "Programmable Logic Controller (PLC)" or programmable controller is an industrial digital computer that has been ruggedized and adapted for the control of manufacturing processes, such as assembly lines, robotic devices, or any activity that requires high reliability, ease of programming, and process fault diagnosis. PLCs may range from small modular devices with tens of inputs and outputs (I/O), in a housing integral with the processor, to large rack-mounted modular devices with thousands of I/O, and which may often be networked to other PLC and Supervisory control and data acquisition (SCADA) systems.

A "computer system" may be described in the general context of computer system executable instructions, such as program modules, being executed by a computer system in the embodiments of the present disclosure. Generally, program modules may include routines, programs, objects, components, logic, data structures, and so on that perform particular tasks or implement particular abstract data types. The components of computer system may include, but are not limited to, one or more processors or processing units, a system memory, and a bus that couples various system components including the system memory to the one or more processors or processing units.

A "processor" may include a module that performs the methods described in accordance with the embodiments of the present disclosure. The module of the processor may be programmed into the integrated circuits of the processor, or loaded in memory, storage device, or network, or combinations thereof.

The term "actuator" may be defined as a component of a device that may be responsible for moving and controlling a mechanism or system of the device, for example by opening a valve. As such, an actuator may be a part of a device or machine that helps the device or the machine to achieve physical movements by converting energy, often electrical, air, or hydraulic, into mechanical force. Simply put, an actuator may be defined as a component in any machine that enables movement and the motion it produces may be either rotary/linear or any other form of movement.

"User Datagram Protocol (UDP)" or sometimes referred to as UDP/IP may be defined as a communications protocol that facilitates exchange of messages between computing devices in a network that uses the Internet Protocol (IP). UDP divides messages into packets, called datagrams, which may then be forwarded by the computing devices in the network to a destination application/server. The computing devices may, for example, be switches, routers, security gateways etc.

"Modbus" is a data communications protocol for use with programmable logic controllers (PLCs). The Modbus protocol uses character serial communication lines, Ethernet, or the Internet protocol suite, as a transport layer.

"Open Platform Communications (OPCs)" is an interoperability standard for secure and reliable exchange of data in the industrial automation space and in other industries. It is platform independent and ensures seamless flow of information among devices from multiple vendors.

The "SECS (SEMI Equipment Communications Standard)/GEM (Generic Equipment Model)" standards are a semiconductor's equipment interface protocol for equipment-to-host data communications. In an automated fabrication, the interface may start and stop equipment processing, collect measurement data, change variables, and select recipes for products.

"Profinet" may be defined as an industry technical standard for data communication over Industrial Ethernet. Profinet is designed for collecting data from, and controlling equipment in industrial systems, with a particular strength in delivering data under tight time constraints.

The term "anomaly detection" may be defined as the identification of rare items, events, or observations which raise suspicions by differing significantly from the baseline of the data associated with the device. Anomaly detection may be used to detect and alert about an abnormal event in the device.

The term "predictive analysis" may encompass a variety of statistical techniques from data mining, predictive modelling, and machine learning, which analyze current and historical facts to make predictions about future or otherwise unknown events. Predictive Analysis may be used to predict failure well in advance. Predictive analytics is an area of statistics that deals with extracting information from data and using it to predict trends and behavior patterns. Often the unknown event of interest is in the future, but predictive analytics can be applied to any type of unknown events whether it be in the past, present, or future.

The term "machine learning" may refer to as study of computer algorithms that may improve automatically through experience and by the use of data. Machine learning algorithms build a model based on sample data, known as "training data," in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

In machine learning, a common task is the study and construction of algorithms that can learn from and make predictions on data. Such algorithms function by making data-driven predictions or decisions, through building a mathematical model from input data. These input data used to build the model are usually divided in multiple data sets. In particular, three data sets are commonly used in various stages of the creation of the model: training, validation, and test sets.

The model is initially fit on a "training data set," which is a set of examples used to fit the parameters of the model. The model is trained on the training data set using a supervised learning method. The model is run with the training data set and produces a result, which is then compared with a target, for each input vector in the training data set. Based on the result of the comparison and the specific learning algorithm being used, the parameters of the model are adjusted. The model fitting can include both variable selection and parameter estimation.

Successively, the fitted model is used to predict the responses for the observations in a second data set called the "validation data set." The validation data set provides an unbiased evaluation of a model fit on the training data set while tuning the model's hyperparameters. Finally, the "test data set" is a data set used to provide an unbiased evaluation of a final model fit on the training data set.

The term "real-time data" may be defined as data that is not kept or stored but is passed along to the end user as quickly as it is gathered. The term "input sources" may be defined as any equipment based internal or external input sources that produce signals and measurements in real-time.

In accordance with the embodiments of this disclosure, a system to manage real-time alerts using machine learning is disclosed. The system comprises a computing device configured to receive real-time data for one or more parameters of a device for which an alert is to be generated, from one or more sources associated with the device, and select a first machine learning model from a plurality of machine learning models based on the received real-time data. The computing device of the system according to the present embodiment of the disclosure is further configured to determine at least one anomaly in the device based on the selected first machine learning model and predict an impact of the determined at least one anomaly based on a second machine learning model of the plurality of machine learning models. Furthermore, the computing device of the system according to the present embodiment of the disclosure is also configured to generate the alert for the device in real-time based on the predicted impact of the determined at least one anomaly and receive feedback on the generated alert in real-time. The first machine learning model and the second machine learning model are trained in real-time based on the received feedback.

In accordance with the embodiments of this disclosure, the one or more sources associated with the device are configured to collect data for the one or more parameters of the device.

In accordance with the embodiments of this disclosure, the system further comprises a remote computing device located remotely from the device and connected to the device via a communication network. The remote computing device is configured to train at least one of the plurality of machine learning models based on the collected data for the one or more parameters of the device.

The various embodiments throughout the disclosure will be explained in more detail with reference to figures.

FIG. 1 illustrates an example machine learning based real-time intelligent and automated alert lifecycle management in accordance with the embodiments of the present disclosure. FIG. 1 depicts an edge device 100, which may be an edge location of a device in accordance with the embodiments of the present disclosure. The term "device edge" may be replaced by the term "equipment edge" without departing from the scope of the present disclosure. The edge device 100 is defined as a location that is close to a source of data generation such that response times are ultra-low (milliseconds), and bandwidth and cost of handling data is optimal.

Further, FIG. 1 depicts a device 103 that uses electrical, mechanical, thermal, etc., power, and has several parts, each with a definite function and together performing a particular task. The device 103 may be any equipment such as a robotic equipment, pick and place equipment, die attach equipment, garbage sorting equipment, automated precision die bonder, optical inspection equipment, compute instances in a data center, etc.

Tuning of the device 103 means adjusting parameters so that the device 103 works well. Calibration and tuning of the device 103 used for semiconductor fabrication, such as pick and place equipment, die attach equipment, is even more important, as we are dealing with precisions in nano and micrometers. All mechanical parts wear, and all electronic components drift over time, so a measuring instrument may not measure accurately to its specifications forever, it must be calibrated and re-tuned routinely to make sure that it operates properly.

The device 103 may have internal sensors 104, which are physically attached to the device 103 and help with proper functioning of the device 103. Internal sensors 104 may be coupled to, or mounted on to the device 103, and may provide real-time measurements of the conditions of the device 103 during its operation. Internal sensors 104 may be used for measuring motion, pressure, axis position, acceleration, rotation, tilt, temperature, vibrations, humidity, etc. These internal sensors 104 may be connected in a wired or wireless way to device's Data Acquisition System (DAQ) or its Programmable Logic Controller (PLC) or any other data acquisition or control system.

Measurement of conditions on the device 103 may be supplemented with external sensors 109. These external sensors 109, such as Bosch XDK sensor, etc., measure motion, vibrations, acceleration, temperature, humidity, etc., and may provide sensing of additional parameters that may be missed by the internal sensors 104.

In accordance with the embodiments of the present disclosure, the device 103 also contains an internal processing system 112 such as a computer system. The computer system is only one example of a suitable processing system 112 and is not intended to suggest any limitation on to the scope of use or functionality of embodiments of the methodology described herein. The processing system 112 shown in FIG. 1 may be operational with numerous other general purpose or special purpose computing system environments or configurations. Examples of well-known computing systems, environments, and/or configurations that may be suitable for use with the processing system 112 shown in FIG. 1 may include, but are not limited to, personal computer systems, server computer systems, thin clients, thick clients, multiprocessor systems, etc.

In accordance with an embodiment of the present disclosure, the processing system 112 acts as a Process Control Master (PCM) and features an intuitive machine/process interface that includes all referencing, positioning, handling, and system control and management. The processing system 112 also features access to all internal sensor data through DAQ, process and machine logs, equipment operational performance data, and system state data, such as, if the device 103 is running or under some type of maintenance, etc. The processing system 112 also features controller interface to actuate parameters through respective actuators on the device 103. Further, the processing system 112 may be coupled to a database 113 on a storage device. This database 113 may store sensor data, test data, device performance data, logs, configuration, etc.

In accordance with an embodiment of the present disclosure, the processing system 112 may have one or more display devices 114 for an operator of the device 103. The display device 114, for example, may be a monitor or simply a display in an embodiment of the present disclosure. The display device 114 is communicatively connected to the processing system 112, and the display device 114 acts as an interface for the operator to the device 103. The display device 114 gives the operator insights into the working of the device 103, the process, errors, and any such information of the device 103. In one embodiment, the alerts for the operator are displayed to the operator through a visual, audio, vibrational, or any other alarm right on the display device 114. In one embodiment, the display device 114 may be a Liquid crystal display (LCD), Light-emitting diode (LED), Quantum dot LED (QLED) display, Organic light-emitting diode display (OLED) or any other display.

FIG. 1 depicts a separate external computer or processing system 115 installed close to the device 103 and includes one or more processors or processing units, a system memory, and a bus that couples various system components including the system memory to the one or more processors or processing units. This external computer or processing system 115 comprises executable instructions for data access from disparate data sources, external sensors, process control master, databases, external data sources, etc., via any communication protocol, such as User Datagram Protocol (UDP), MODBUS, SECS/GEM, Profinet, or any other protocol, and via any communication network 106, such as ethernet, Wi-Fi, Universal Serial Bus (USB), ZIGBEE, cellular or 5G connectivity, etc. This external computer or processing system 115 also comprises executable instructions for running trained machine learning models against real-time disparate data.

Computer readable program instructions may be downloaded to the processing system 112 from a computer readable storage medium or to the external computer or processing system 115 via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each processing system 112 or processing system 115 receives computer readable program instructions from the network and forwards the computer readable program instructions for storage in a computer readable storage medium within the respective processing system 112 or processing system 115.

In accordance with an embodiment of the present disclosure, the external computer or processing system 115 may execute machine learning models using techniques such as, but not limited to, Dynamic Time Warping (DTW), Frequency Domain Analysis, Time Domain Analysis, Deep Learning, Fuzzy Analysis, Artificial Neural Network Analysis, Xgboost, Random Forest, Support Vector Machine (SVM) Analysis, etc., for anomaly detection, prediction, and adaptive control of the actuator.

FIG. 1 further depicts that the external computer or processing system 115 presents training data, features and relevant contextual and environment variables to a remote computer or processing system 124 for training of a machine learning model. Communication between the external computer or processing system 115 and the remote computer or processing system 124 may be via communication network 118 such as local area network (LAN), a general wide area network (WAN), and/or a public network (e.g., the Internet, Wi-Fi, 5G) via network adapter etc. Remote computer 124 may be located on an on-prem location, remote to the edge site, or may be in a cloud. A skilled person in the art may understand that although not shown, other hardware and/or software components may be used in conjunction with the remote computer 124. Examples include, but are not limited to a microcode, device drivers, redundant processing units, external disk drive arrays, Redundant Array of Independent Disks (RAIDs) systems, tape drives, and data archival storage systems, etc.

In an embodiment of the present disclosure, sensor data from the internal sensors 104 such as axis power consumption, accelerometer readings, axis position data from a silicon photonic optical alignment device is accessed through a Programmable Logic Controller (PLC) on the device 103, using, for example, TwinCAT protocol, by the PCM on the processing system 112 of the device 103. The processing system 112 also captures other context data in real-time in its internal computer storage/database 113. The context data captured may be, but not limited to, process logs, motion settings, position errors, axis movements, module test results, yield, jerk settings etc. Said sensor data from the internal sensors 104 and context data may be requested by the external computer 115 at an ultra-low frequency, for example, 25 ms, over UDP communication network 106 using a UDP Input/Output (TO) manager. External computer 115 correlates said data together on time and other labels, such as module ID, etc. External computer 115 presents this data to its runtime engine in real-time as it comes into its internal memory buffer. External computer 115 runtime engine runs a pre-trained machine learning algorithm on this data set with intent to decrease position errors during movement, the algorithm ensures motion error is not so large that it affects the yield and tries to maintain motion errors during large movements which creates excess vibrations. External computer 115 uses the needed sensor and context data from internal memory, so that there is no lag or time wasted in making a database or any other TCP connection. This is critical for ultra-low latency inferencing. The output of the algorithm is a jerk setting for the motion. Output from another algorithm may be a predicted value for a better starting position for the device 103 moving components. This output may also be stored in memory for ultra-low latency needs. Jerk is defined as sharp sudden movement; it is a derivative of acceleration with respect to time. These jerk settings are validated to be within accepted bounds, and also validated to create a positive impact on the cycle times. These predicted jerk settings are sent from the external computer 115 over the UDP communication network 106 to the internal computer 112 of the device 103. Alerts and recommended values are presented on the display device 114 with impact details of not using the predicted values. The benefits for the recommendations may also be presented to the operator, such as, the settings enable to smooth out the vibrations of the motion, optimized jerk settings allow the device 103 to run as fast as possible (maximize UPH) while maintaining optimal yield. Once operator acts on the alert, and does the desired settings, resultant jerk and starting positions settings are reconveyed automatically through the said channels, to the external computer 115 over the communication network 106 by the internal computer 112 to readjust, if needed. All this happens in ultra-low frequency. In an embodiment, as soon as the data request is triggered by the external computer 115 till inference on the jerk setting is sent back via alerts, all this happens in 5 to 25 ms. These ultra-low latency alerts and proper impact analysis were found to reduce cycle time, increasing the UPH while keeping yield intact. This also enables reduced vibration and enables less wear and tear on device parts. It also enabled localized tuning of the device 103 as the algorithm and settings may be specific for each device while considering environmental changes, change in dynamics of individual devices, wear and tear and life of the parts as well as any structural defects in the individual device. The jerk and starting position prediction alerts and recommendation in this case may be adaptable if the process behavior changes due to ageing, drift, wear, etc. The machine learning model may account for the changes and come up with most optimal jerk settings or starting positions for axis based on the complete contextual and environmental information.

A specific example of jerk self-tuning in accordance with an embodiment of the present disclosure may be an algorithm designed to look at motion information—absolute position and position errors—across 3 independent axes, as well as optical power through a focusing lens. As the focusing lens is moved, the algorithm collects this data and returns an optimum jerk (derivative of acceleration) based on individual axis position errors relative to which axis/combination of axis are moving at any given time, as well as how noisy the optical power data is during the movements.

In accordance with one embodiment, all disparate data sources such as sensor data of the internal sensors 104, such as motion, axis position, acceleration, rotation, tilt, temperature, vibrations, humidity, etc.; sensor data of the external sensors 109 that supplements the device sensor data and is collected by installing external sensors 109 on the device 103; image data such as component cracks, placement, operator action, etc.; context data from internal storage device/database 113, such as device functioning state, errors, testing data, parts inventory, age and wear on the parts, material details, preventive maintenance schedule, orders and delivery schedules, operator capabilities and other such data that forms the background information that provides a broader understanding of an event, person, or component; environmental changes surrounding the device 103, such as a fan being on near the device 103, device 103 being close to a heat source, device 103 being close to a vibration source, humidity, etc.; changes in dynamics of the device 103, age and wear of device 103 parts; structural damages, and changes in material, are taken into account to train machine learning models at remote computer 124, using techniques such as, Dynamic Time Warping (DTW), Frequency Domain Analysis, Time Domain Analysis, Deep Learning, Fuzzy Analysis, Artificial Neural Network Analysis, Xgboost, Random Forest, Support Vector Machine (SVM) Analysis, etc.

In an embodiment of FIG. 1, the device 103 is used in manufacturing and has internal sensors 104 and external sensors 109 that sense and capture real-time data. The data store or the database 113 and the device's internal computer or processing system 112 capture context data such as part serial number, equipment configuration, machine state, machine, and process logs, etc. The device's internal computer 112 may also communicate and capture data from its internal sensors 104 via any suitable communication network. A separate external computer or processing system 115 communicates with the device's internal computer 112 via a suitable communication network 106, such as UDP. In accordance with the embodiments of the present disclosure, this communication between the external computer 115 and the internal computer 112 may be two ways, thus enabling data access as well as sending back actuation commands. External computer 115 may also communicate with external sensors 109 via a suitable communication network 106, such as USB. External computer 115 may also communicate with the internal computer 112 via a suitable communication network 106, such as UDP to acquire logs and other contextual information in real-time.

In accordance with an embodiment of the present disclosure, external computer 115 provides and transfers training data to a machine learning training platform on the remote computer 124 via communication network 118 such as local area network (LAN). Remote computer 124 choses appropriate machine learning algorithm and trains the machine learning model. Computer instructions representing the trained model are then deployed on the external computer 115 for local, at the edge inferencing. Real-time internal sensor data 104, external sensor data 109, context and logs data, as well as external environmental data is presented at time-triggered intervals or as the data comes into the machine learning runtime on external computer 115. Real-time inferencing is done using the proper trained machine learning model running on the external computer 115, and results of the inferencing are used for alerts, or displaying normal behavior, or predicting an anomaly, or the results are validated for safe operations and improvements and used to actuate and set certain parameters on the device 103 via two-way communication 106 with the internal computer 112. In an embodiment, to make the alert as effective as possible and for the operator to act on the alert as soon as possible, the alerts are displayed, visually or through any suitable mechanism, right on the display device 114 interfacing the operator. In further embodiment, the reaction time of the operator to acknowledge the alert and time to address the alert or time to summon a technician or time for technician to start the work or time for technician to schedule the fix or time when the issue associated with the alert is resolved, and all such information associated with the life cycle of the alert is tracked at the internal computer 112 and communicated via a suitable communication network 106, such as UDP to the external computer 115, where further actions related to the life cycle management of the alerts are executed.

So, in accordance with the embodiments of the present disclosure, sensor data (from the internal sensors 104 and external sensors 109), context data, environmental changes surrounding the device 103, changes in dynamics of the device 103, age and wear of device 103 parts, structural damages, and changes in material, are all considered in real-time by the machine learning models running on the external computer 115 to adjust operation parameters of the device 103 to improve the OEE.

In accordance with an embodiment of the present disclosure machine learning models running on the external computer 115 and the adaptive control loop to activate the operation parameters after inference, are fed back in real-time over the communication network 106 to the internal computer 112. The operation parameters are then actuated by the internal computer 112 using preferred protocol and the resulting sensor data from the internal sensors 104 and external sensors 109 is fed back through the communication network 106 to the external computer or processing system 115. The changed values of the operation parameters may be on target, in phase with an input signal, or out of phase with an input signal. The machine learning models running on the external computer 115 may then further be corrected to achieve the target state. When signal feedback from output is in phase with the input signal, the feedback adaptive control is called positive feedback adaptive control. When signal feedback from output is out of phase with the input signal, the feedback adaptive control is called negative feedback adaptive control.

In an embodiment of the present disclosure, the machine learning models running on the external computer 115 are trained to output estimated adaptive control parameters that are directly used in an adaptive controller (not shown) of the device 103, thereby enabling direct adaptive control. In another embodiment, the machine learning models running on the external computer 115 are trained to output estimated adaptive control parameters that are used to calculate other controller parameters in the adaptive controller of the device 103, thereby enabling indirect adaptive control. In yet another embodiment of the present disclosure, the machine learning models running on the external computer 115 are trained to output estimated adaptive control parameters. Both estimation of the controller parameters and direct modification of the controller parameters are used by the adaptive controller of the equipment 103, thereby enabling hybrid adaptive control.

In an embodiment of the present disclosure, adaptive control machine learning models running on the external computer 115 may be used to self-calibrate and self-tune the device 103 continuously to get most optimal performance from the device 103. Calibration of the device 103 and device's internal sensors 104 is important to ensure accurate measurements, product quality, safety, profitability, complying with regulations, return on investment, reduction in production errors and recalls, and extending life of the device 103. In an embodiment of the present disclosure, the machine learning models running on the external computer 115 would get real-time sensor data and context data and determine the most optimal calibration parameters. The determined calibration parameters are compared to see if there is any drift, then these determined calibration parameters are validated for safety, threshold, and improvements. The determined calibration parameters, if drifted, are conveyed to the operator and/or a technician via alerts displayed on the display device 114. In an embodiment of the present disclosure, the calibration drift inference as well as impact of not correcting the drift, determined and learned from historic calibration and impact data, are determined by proper machine learning models on the external computer 115 and communicated in real time over communication network 106 to the internal computer 112 and displayed on the display device 114 for the operator. Once the calibrations are fixed and the alert is addressed, the set values are then feedback through said communication network 106 to the machine learning model running on the external computer 115 to validate the change as well as improvement, or to further send the alert for re-calibration and re-tuning.

In accordance with the present disclosure, anomaly detection is the identification of rare items, events or observations which raise suspicions by differing significantly from the baseline of the data. Predictive Analysis encompasses a variety of statistical techniques from data mining, predictive modelling, and machine learning, which analyze current and historical facts to make predictions about future or otherwise unknown events. Anomaly detection can detect and alert about an abnormal event in the device 103, and Predictive Analysis can predict failure well in advance. However, these alerts and predictions still require manual intervention and a lag in fixing the issue resulting in yield reduction and/or part failures. The present disclosure uses the predictions and anomaly detection from machine earning models to do adaptive control in real-time and get the most out of the device 103.

In an embodiment of the present disclosure, manual intervention to act on an anomaly or part failure prediction analysis is automated by automatically adjusting the operation parameters with adaptive control to correct the anomaly, by self-maintaining the performance level of the device 103, and by providing detail root causes and Out of Control Action Plans (OCAPs) instructions to an operator. This helps to get the most out of the device 103 and saves operator time to determine the root cause and to come up with an action plan.

Further, in an embodiment of the present disclosure, adaptive control machine learning models running on the external computer 115 may take into account contextual information, such as real-time yield and sensor information, such as acceleration, motion errors, axis errors, jerk settings, etc., and try to alert the operator as well as any process engineer when UPH improvement process changes may be affecting the yield. In an embodiment of the present disclosure, the machine learning models running on the external computer 115 may also alert the operator as well as the process engineer that the device 103 may go faster as that would not affect the yield. The yield may be constantly monitored in real-time so any changes to operation parameters to speed up the device 103 that causes adversarial effect on yield may be caught at ultra-low latency and may be alerted and acted upon and thus speed of the device 103 may be brought back. This enables very effective alerts where machine learning models consider all the relevant factors.

In an embodiment of the present disclosure, adaptive control machine learning models running on the external computer 115 may take into account contextual information about an operator, for example unsafe hand position determined using a machine vision camera sensor, or contextual information about a costly device part that would break if not acted upon quickly. The machine learning models infer at the edge device 100 from the desperate relevant data streams/data sources and issue alerts in an ultra-low latency on display device 114 and recommend an immediate stopping or slowing of the device 103, with clear impact analysis of not doing so, to enable safe working condition. Immediate alerts on the device 103 to eliminate an unsafe working condition for the operator, equipment, or part usually at ultra-low frequency saves lives and device parts.

In an embodiment of the present disclosure, when a device operator receives an alert or a notification of anomaly of an equipment part misbehavior and optionally gets a criticality level for the alert, the tendency is to address the anomaly immediately or in the next scheduled maintenance window, affecting production time for the device 103. In many instances, the anomaly or the part misbehavior may not be critical enough to stop operations. In an embodiment, based on historic data, intelligence is gathered of device states where the device 103 may keep operating without impacting the device parts, or the produced components in a significant way. The embodiments of the present disclosure use machine learning to operate in Fail Operational state or a degraded state and keep manufacturing parts, thus increasing the UPH. Fail Operational state is defined as safe to operate state even after a failure. In an embodiment of the present disclosure, sensor data (from the internal sensors 104 and the external sensors 109) and context data, such as device functioning state, errors, testing data, parts inventory, age and wear on the parts, material details, preventive maintenance schedule, orders and delivery schedules, history of the degraded state, operator capabilities and other such data that forms the background information that provides a broader understanding of an event, person, or component, is used by the machine learning models running on the external computer 115 to determine if despite of the error, the device 103 may operate in Fail Operational state. The machine learning model may be trained to operate in Fail Operational state when it is determined to be safe enough to continue operations in a Fail Operational state with necessary automatic tuning to account for the misbehaving part, where the system may continue to function after a failure. This assures Fail Passive behavior for the device 103, which means the system may not misbehave after a failure.

In accordance with an embodiment of the present disclosure, the anomaly detection is done by looking at historical data and identifying trends in the data that are undesirable. As an example, the data may consistently vary around some mean value, say 0, but if the mean starts to shift upward (resulting in a ramp away from 0 over time) a machine learning model may pick this up and flag the pattern as being an anomaly. This information can then be used as a basis for informing a user of a potential issue with the device 103.

In accordance with an embodiment of the present disclosure, machine learning model training may happen at the edge, close to the data source, in the cloud, or on any remote computer. In certain embodiments, the mathematical representations of the machine learning model training details are stored in memory close to the source of input data. Disparate relevant data streams are fed in memory to a machine learning runtime engine running on the external computer 115 close to the data source in order to get low latency inferencing. In an embodiment of the present disclosure, inferencing from the machine learning models may happen in real-time at the external computer 115 at an ultra-low frequency of 5 to 30 ms. Further, the inferences and results from the machine learning algorithms are validated for proper behavior and improvements are fed back to the internal computer 112 for actuation. The internal computer 112 actuates the desired parameters and results of the changes are fed to the run-time engine on the external computer 115 to validate improvements or do further changes, thereby achieving improvements in equipment uptime, UPH, yield, cost of operation, spare parts usage, cycle time improvements, and Overall Equipment Effectiveness (OEE) improvements.

In one embodiment, model training and retraining may be performed based on one or more device or manufacturing process optimization characteristics and alerts are set up when one of the monitored characteristics is beyond a threshold or is trending towards an abnormality. Examples of optimization characteristics include, but are not limited to, reducing equipment downtime, increasing first pass and overall yield of manufacturing, increasing the Units Produced per hour, improving the availability of the device, improving unscheduled downtime, improving Mean Time Between Failure (MTBF), improving Mean Time to Repair (MTTR) and other device or manufacturing process characteristics.

In accordance with another embodiment, edge inferencing at the external computer 115 from disparate input data sources (the internal sensors 104 and the external sensors 109) may be done in real-time without a machine learning model and without any training of the model or with un-supervised training, based on simple rules or algorithms derived from experience of Subject Matter Experts (SMEs). The inferences are then feedback to a controller through the device's internal computer 112 for actuating and tuning various parameters in the device 103. Without a machine learning model, this may be done for example based on a rules-based implementation. As such, the user may understand the device data well enough to build known alert rules/escalations/actions, and would leverage this knowledge to build custom alerts, either directly to the device 103 or more passively via for example an email.

In one aspect of the embodiment, context information that forms the background information that provides a broader understanding of the whole process, the device 103, its operation, or the events, as well as environmental changes surrounding the device 103 are correlated and stitched together at the external computer 115 with the sensor data (from the internal sensors 104 and external sensors 109), to create context-aware data for inference and root causing. For example, this data may be stitched together by an embodiment of the present disclosure primarily by timestamping the data as it is received, or back calculating the timestamp if the data is received in batches. This timestamp may then be used to determine what may have happened (for example where and when). These context-aware inferences generated at the external computer 115 may then be provided as an input to controllers and actuators to adapt to the context-aware data. This enables fine tuning and customized configuration of the device 103 taking the context and environment of the device 103 into consideration.

Further embodiments may allow ultra-low latency adaptive control, Fuzzy adaptive control, positive or negative feedback adaptive control, feed-forward adaptive control, fail operational adaptive control, self-adaptive tuning and control with or without contextual intelligence or environmental intelligence, Direct adaptive control, Indirect adaptive control, or Hybrid adaptive control.

In accordance with another embodiment, ultra-low latency time triggering may be used for data collection and for machine learning inference cycling. The time triggering may be independent for each step and optimized for efficiency. The time triggering may trigger all related machine learning models, such as machine learning models for anomaly detection, predictive analysis, alert classification, alert prioritization, alert impact analysis, alert quantification, and so on, simultaneously, sequentially or asynchronously.

In an embodiment of the present disclosure, ultra-low latency alerts may be displayed on a display device associated with the external computer 115. In another embodiment, the alerts may be on any other edge display or on any other remote display, besides the display device 114 associated with the operator. In an embodiment, the alerts may be displayed or presented on multiple displays to multiple personnel, such as operator, technician, process engineer, process manager, etc., simultaneously, based on the severity and criticality of the alert. In another embodiment of the present disclosure, the alerts may be local or remote, visual or sound based alerts, or the alerts may be local or remote SMS, email, phone call, voice mail, collaboration channel message, such as Slack or Teams or Skype message, to an individual or a group, social network message, such as WhatsApp or Facebook message, radio message, pager message, or any other type of effective notification message.

So, in accordance with the embodiments of the present disclosure, sensor data (from the internal sensors 104 and the external sensors 109), context data, environmental changes surrounding the device 103, changes in dynamics of the device 103, age and wear of device parts, structural damages, and changes in material, are all considered in real-time by the machine learning models running on the external computer 115 to alert operators or other persons associated with the equipment to improve Overall Equipment Effectiveness (OEE).

Figure 2:
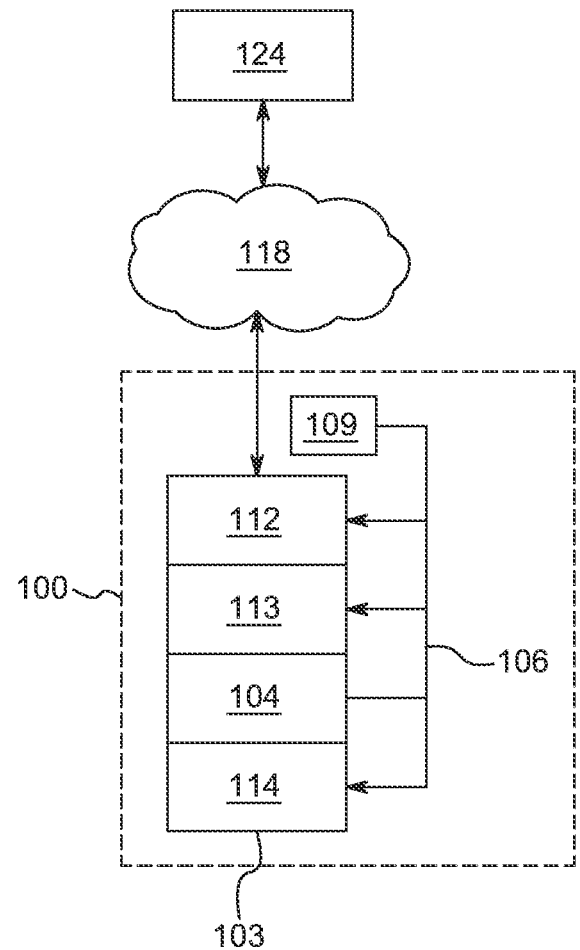
FIG. 2 illustrates another example machine learning based real-time intelligent and automated alert lifecycle management in accordance with the embodiments of the present disclosure.

FIG. 2 illustrates another example machine learning based real-time intelligent and automated alert lifecycle management in accordance with the embodiments of the present disclosure. FIG. 2 will be explained in conjunction with description of FIG. 1.

In accordance with an embodiment of the present disclosure, executable instructions for data access from disparate data sources as well as executable instructions for inferencing at the edge of the device at a low latency, which may be present at the separate external computer or processing system 115 may alternatively be deployed and executed on device's internal computer or processing system 112. This is depicted in FIG. 2 of the present disclosure. More particularly, FIG. 2 illustrates another example machine learning based real-time self-adaptive tuning and control system at an edge location in accordance with the embodiments of the present disclosure.

In accordance with an embodiment of the present disclosure, computer instructions that execute on the external computer 115 may run on device's internal computer 112, thus improving on the ultra-low latency for the machine learning and other inference and associated adaptive control. In accordance with another embodiment of the present disclosure, computer instructions that execute on the external computer 115 may run on the internal sensors 104 or the external sensors 109, thus taking adaptive control to an extreme edge where data is produced, which will even further reduce the latency.

FIG. 2 is similar to FIG. 1, except that the external computer 115 is omitted from FIG. 2 and the functionalities that execute on the external computer 115 may run on device's internal computer 112, thereby improving on the ultra-low latency for the machine learning and the associated adaptive control. As such, the description corresponding to FIG. 1 is incorporated herein in its entirety.

In the illustrated example in FIG. 2, the device 103 is used in manufacturing, and has internal sensors 104 and external sensors 109 that sense and capture real-time data. The data store or the database 113 and device's internal computer or processing system 112 capture context data. Process Control Master (PCM) on the device's internal computer 112 may also communicate and capture data from its internal sensors 104 via any suitable communication network. The internal computer 112 may also communicate with the external sensors 109 via a suitable communication network 106, such as USB. The display device 114 is communicatively connected to the processing system 112 and it acts as an interface for the operator to the device 103.

In accordance with an embodiment of the present disclosure, the internal computer 112 provides and transfers training data to a machine learning training platform on the remote computer 124 via communication network 118 such as local area network (LAN). Remote computer 124 choses appropriate machine learning algorithm and trains the machine learning model. Computer instructions representing the trained model are then deployed on the internal computer 112 for local, at the edge inferencing. Real-time internal sensor data 104, external sensor data 109, context and logs data, as well as external environmental data is presented at time-triggered intervals or as the data comes into the machine learning runtime on the internal computer 112. Real-time inferencing is done using the proper trained machine learning model running on the internal computer 112 and results of the inferencing are used for alerts, or displaying normal behavior, or predicting an anomaly, or the results are validated for safe operations and improvements and used to actuate and set certain parameters on the device 103 via two-way communication network 106 with the internal computer 112. In an embodiment, to make the alert as effective as possible and for operator to act on the alert as soon as possible, the alerts are displayed, visually or through any suitable mechanism, right on the operator display device 114. Further, the reaction time of the operator to acknowledge the alert and time to address the alert or time to summon a technician or time for technician to start the work or time for technician to schedule the fix or time when the issue associated with the alert is resolved, and all such information associated with the life cycle of the alert is tracked at the internal computer 112 and communicated via a suitable communication network 106, such as UDP to the external computer 115, where further actions related to the life cycle management of the alerts are executed.

So, in accordance with the embodiments of the present disclosure, sensor data (from the internal sensors 104 and the external sensors 109), context data, environmental changes surrounding the device 103, changes in dynamics of the device 103, age and wear of device parts, structural damages, and changes in material, are all considered in real-time by the machine learning models running on the internal computer 112 to alert operators or other persons associated with the equipment to improve Overall Equipment Effectiveness (OEE).

In accordance with an embodiment of the present disclosure, the calibration drift inference as well as impact of not correcting the calibration drift, determined and learned from historic calibration and impact data, are determined by proper machine learning models on the internal computer 112, and displayed on operator display device 114. Once the calibrations are fixed and alert is addressed, the set values are then feedback through said communication network 106 to the machine learning model running on the internal computer 112 to validate the change as well as improvement, or to further send alert for re-calibration and re-tuning. As such, the inferences and results from machine learning models are validated for proper behavior and improvements are fed back to the internal computer 112.

Figure 3:
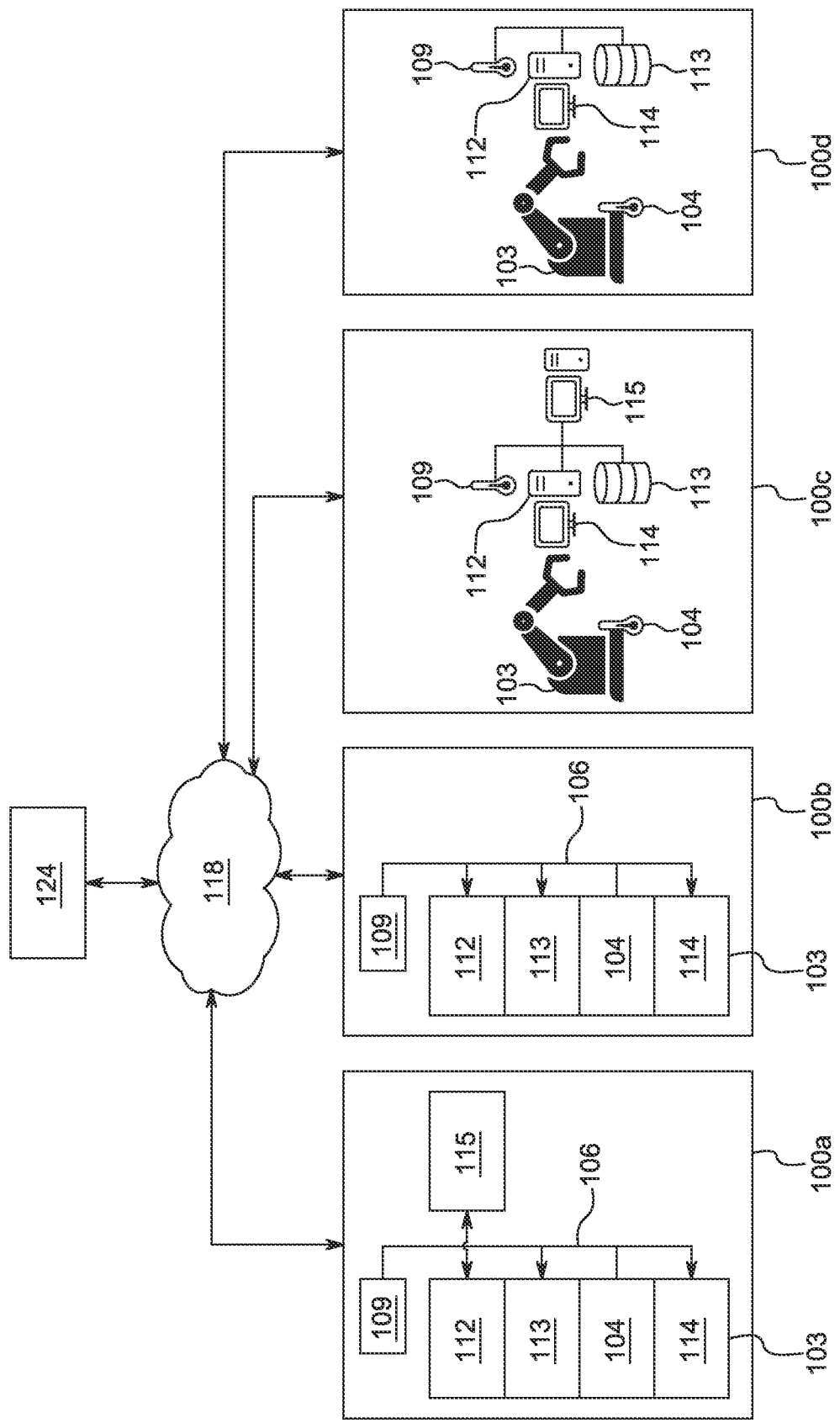
FIG. 3 illustrates yet another example machine learning based real-time intelligent and automated alert lifecycle management in accordance with the embodiments of the present disclosure.

FIG. 3 illustrates yet another example machine learning based real-time intelligent and automated alert lifecycle management in accordance with the embodiments of the present disclosure. FIG. 3 will be explained in conjunction with descriptions of FIG. 1 and FIG. 2, and the descriptions corresponding to FIG. 1 and FIG. 2 are incorporated herein in their entirety.

FIG. 3 depicts a comprehensive view of machine learning based real-time intelligent and automated alert lifecycle management for multiple edge devices 100a, 100b, 100c, and 100d in accordance with an embodiment of the present disclosure. In FIG. 3, the edge device 100a depicts the edge device 100 in accordance with the embodiment of FIG. 1, and the edge device 100b depicts the edge device 100 in accordance with the embodiment of FIG. 2. As such, the edge device 100 of FIG. 1 and the edge device 100 of FIG. 2 are reproduced as the edge device 100a and the edge device 100b, respectively, in FIG. 3.

The description of FIG. 1 and FIG. 2 with respect to the edge device 100 is incorporated herein in its entirety and thus further description of the edge device 100a and the edge device 100b may be omitted for brevity of this disclosure.

Further, in FIG. 3, another edge device 100c is depicted in accordance with an embodiment of FIG. 1 of the present disclosure. The edge device 100c is an illustrative view of the edge device 100 of FIG. 1 of the present disclosure. Similarly, a fourth edge device 100d is depicted in accordance with an embodiment of FIG. 2 of the present disclosure. The edge device 100d is an illustrative view of the edge device 100 of FIG. 2 of the present disclosure. Instead of the block view of the edge devices 100, as represented in FIG. 1 and FIG. 2, the edge devices 100c and 100d depict pictorial representations of various components of the edge device 100c and edge device 100d in FIG. 3. For example, FIG. 3 depicts the device 103 as a pictorial representation of a real-world device. Also, FIG. 3 depicts the internal sensors 104 and the external sensors 109 in a pictorial way to represent the real-world sensors. Similarly, FIG. 3 illustrates the internal computer 112, the external computer 115, the database 113, the display device 114, and the communication network 106 in a pictorial way.

In FIG. 3, the edge device 100c may represent an embodiment in accordance with FIG. 1 of the present disclosure and the edge device 100d may represent another embodiment in accordance with FIG. 2 of the present disclosure. The description of FIG. 1 and FIG. 2 with respect to the edge device 100 is incorporated herein in its entirety and thus further description of the edge device 100c and the edge device 100d may be omitted for brevity of this disclosure.

In FIG. 3, multiple edge devices 100a, 100b, 100c, and 100d are described, and machine learning based real-time intelligent and automated alert lifecycle management is described for the multiple edge devices 100a, 100b, 100c, and 100d in accordance with an embodiment of the present disclosure. All the edge devices 100a, 100b, 100c, and 100d are connected to a remote computer or processing system 124 for training of a machine learning model. Communication between external computer 115 of edge devices 100a and 100c and remote computer 124 may be via communication network 118 such as local area network (LAN), a general wide area network (WAN), and/or a public network (e.g., the Internet, Wi-Fi, 5G) via network adapter etc. Remote computer 124 may be located on an on-prem location, remote to the edge site, or may be in a cloud. Communication between internal computer 112 of edge devices 100b and 100d and remote computer 124 may be via communication network 118.

In accordance with an embodiment of the present disclosure, the external computers 115 of the edge devices 100a and 100c or the internal computers 112 of the edge devices 100b and 100d, provide and transfer training data to a machine learning training platform on the remote computer 124 via communication network 118 such as local area network (LAN). Remote computer 124 choses appropriate machine learning model and trains the machine learning model. Computer instructions representing the trained machine learning model are then deployed on the external computers 115 of the edge devices 100a and 100c or on the internal computers 112 of the edge devices 100b and 100d for local, at the edge inferencing. Real-time internal sensor data 104, external sensor data 109, context and logs data, as well as external environmental data is presented at time-triggered intervals or as the data comes into the machine learning runtime on the external computers 115 of the edge devices 100a and 100c, or the internal computers 112 of the edge devices 100b and 100d. Real-time inferencing is done using the proper trained machine learning model running on the external computers 115 of the edge devices 100a and 100c, or the internal computers 112 of the edge devices 100b and 100d, and results of the inferencing are used for alerts, or displaying normal behavior, or predicting an anomaly, or the results are validated for safe operations and improvements and used to actuate and set certain parameters on the device 103 via two-way communication 106 with the internal computer 112. In an embodiment, to make the alert as effective as possible and for operator to act on the alert as soon as possible, the alerts are displayed, visually or through any suitable mechanism, right on the operator display device 114. Further, the reaction time of the operator to acknowledge the alert and time to address the alert or time to summon a technician or time for technician to start the work or time for technician to schedule the fix or time when the issue associated with the alert is resolved, and all such information associated with the life cycle of the alert is tracked at the internal computer 112 of the edge devices 100b and 100d or communicated via a suitable communication network 106, such as UDP to the external computers 115 of the edge devices 100a and 100c, where further actions related to the life cycle management of the alerts are executed.

Figure 4:
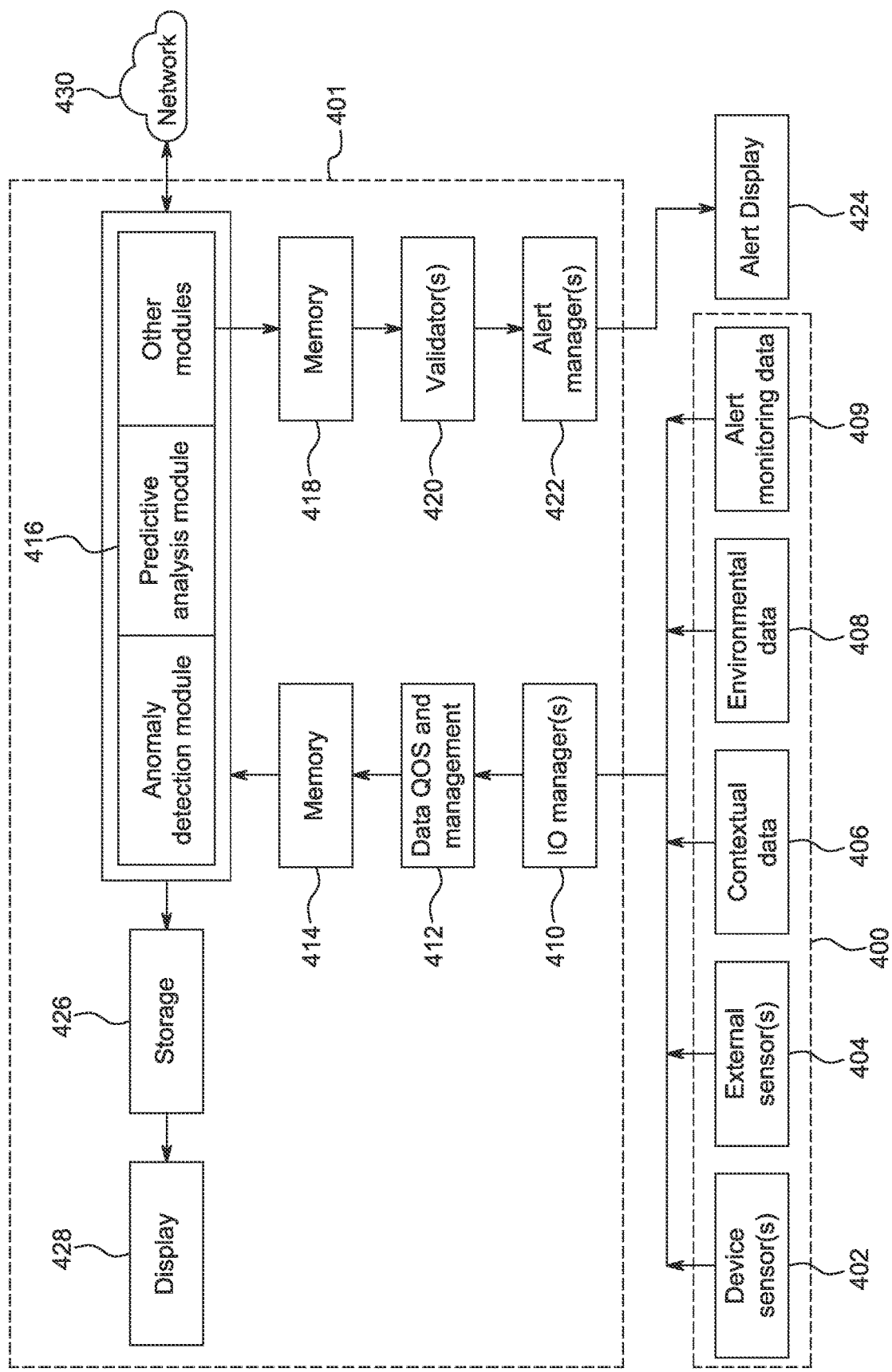
FIG. 4 illustrates a schematic illustration of a real-time machine learning-based system for providing alert lifecycle management based on disparate input sources in accordance with an embodiment of the disclosure.

FIG. 4 illustrates a schematic illustration of a real-time machine learning-based system for providing alert lifecycle management based on disparate input sources in accordance with an embodiment of the disclosure. FIG. 4 will be explained in conjunction with descriptions of FIG. 1 and FIG. 2, and the descriptions corresponding to FIG. 1 and FIG. 2 are incorporated herein in their entirety.

In accordance with an embodiment of the present disclosure, disparate input sources 400 may be any device based internal or external input sources that produce signals and measurements in real-time. Internal sensors 402 are sensors located internal to the device 103 (not shown in FIG. 4) that come with the device 103, which are physically attached to the device 103 and help with proper functioning of the device 103. Internal sensors 402 may be coupled to, or mounted on to the device 103, and may provide real-time measurements of the conditions of the device 103 or the process during operation. Internal sensors 402 may be used for measuring motion, pressure, axis position, acceleration, rotation, tilt, temperature, vibrations, humidity, etc. Measurement of conditions on the device 103 may be supplemented with external sensors 404. These external sensors 404, such as Bosch XDK sensor, or machine vision cameras etc., measure motion, vibrations, acceleration, temperature, humidity, etc., or image data such as component cracks, placement, operator action, etc. The external sensors 404 may provide sensing of additional parameters that may be missed by the internal sensors 402. Contextual data 406 may be an additional data source. Contextual data 406 such as device functioning state, errors, testing data, parts inventory, age and wear on the parts, material details, preventive maintenance schedule, orders and delivery schedules, operator capabilities and other such data that forms the background information that provides a broader understanding of an event, person, device or component, and adds context to the sensor data (from the internal sensors 402 and the external sensors 404) and enables better intelligence. Environmental data 408 such as, environmental changes surrounding the device 103, such as a fan being on near the device 103, device 103 being close to a heat source, device 103 being close to a vibration source, humidity, etc.; changes in dynamics of the device 103, age and wear of device parts, structural damages, and changes in material, supplement all other data sources. Alert monitoring data 409 provides feedback on the life cycle of the alert. Alert monitoring data 409 may include, but not limited to, reaction time of the operator to acknowledge the alert, time to fix the issue or summon a technician, time for technician to schedule a fix, actual time to fix, evidence of fix, permission for fix, steps taken for the fix, who all were notified, escalation path of the alert, actual impact of the alert, downtime due to the alert, and any other information that help track the life cycle of the alert. All these disparate data sources may be taken into account to train and infer from various machine learning models running at the edge device 100 (of FIG. 1 and/or FIG. 2).

An edge compute engine 401, depicted in FIG. 4 may be an edge compute engine of the edge device 100, as depicted in FIG. 1 and/or FIG. 2 of the present disclosure. More particularly, the edge compute engine 401 may be a part of the device 103 (for example the edge compute engine 401 may be the internal computer 112) or may be external to the device 103 (for example the edge compute engine 401 may be the external computer 115). In an embodiment of the present disclosure, the edge compute engine 401 provides processing power for accessing disparate data sources 400, using machine learning computer instructions at the edge device 100 for inference, storage, display, processing real-time alerting instructions, and for executing instructions for alert life cycle management. Edge compute engine 401 constitutes one or more processors 416, employed to implement the machine learning algorithms, time triggering, anomaly detection, predictive analysis, root causing, alert categorization and prioritization, alert impact analysis and quantification, etc. One or more processors 416 may comprise a hardware processor such as a central processing unit (CPU), a graphical processing unit (GPU), a general-purpose processing unit, or computing platform. One or more processors 416 may be comprised of any of a variety of suitable integrated circuits, microprocessors, logic devices, and the like. Although the disclosure is described with reference to a processor, other types of integrated circuits and logic devices may also be applicable. The processor may have any suitable data operation capability. For example, the processor may perform 512 bit, 256 bit, 128 bit, 64 bit, 32 bit, or 16 bit data operations. One or more processors 416 may be single core or multi core processors, or a plurality of processors configured for parallel processing.

The one or more processors 416 may include different modules for example anomaly detection module to detect and alert about an abnormal event in the device 103, and a prediction analysis module for extracting information from data and using it to predict trends and behavior patterns. Similarly, the one or more processors 416 may include any other modules that may have any suitable data operation capability.

The one or more processors 416 may be part of a larger computer system and/or may be operatively coupled to a computer network (a "network") 430 with the aid of a communication interface to facilitate transmission of and sharing of data and predictive results. The computer network 430 may be a local area network, an intranet and/or extranet, an intranet and/or extranet that is in communication with the Internet, or the Internet. The computer network 430 in some cases is a telecommunication and/or a data network. The computer network 430 may include one or more computer servers, which in some cases enables distributed computing, such as cloud computing. The computer network 430, in some cases with the aid of a computer system, may implement a peer-to-peer network, which may enable devices coupled to the computer system to behave as a client or a server.

The edge compute engine 401 may also include memory 414 or memory locations (e.g., random-access memory, read-only memory, flash memory), electronic storage units (e.g., hard disks) 426, communication interfaces (e.g., network adapters) for communicating with one or more other systems, and peripheral devices, such as cache, other memory, data storage and/or electronic display adapters. The memory 414, storage units 426, interfaces and peripheral devices may be in communication with the one or more processors 416, e.g., a CPU, through a communication bus, e.g., as is found on a motherboard. The storage unit(s) 426 may be data storage unit(s) (or data repositories) for storing data.

The one or more processors 416, e.g., a CPU, execute a sequence of machine-readable instructions, which are embodied in a program (or software). The instructions are stored in a memory location. The instructions are directed to the CPU, which subsequently program or otherwise configure the CPU to implement the methods of the present disclosure. Examples of operations performed by the CPU include fetch, decode, execute, and write back. The CPU may be part of a circuit, such as an integrated circuit. One or more other components of the system may be included in the circuit. In some cases, the circuit is an application specific integrated circuit (ASIC).

The storage unit 426 stores files, such as drivers, libraries, and saved programs. The storage unit 426 stores user data, e.g., user-specified preferences and user-specified programs. The edge compute engine 401 in some cases may include one or more additional data storage units that are external to the edge compute engine 401, such as located on a remote server that is in communication with the edge compute engine 401 through an intranet or the Internet. The edge compute engine 401 may also have a display 428 for visualization.

The edge compute engine 401 also comprises one or more IO Managers 410, and 422. IO Managers 410 and 422 are software instructions that may run on the one or more processors 416 and implement various communication protocols such as User Datagram Protocol (UDP), MODBUS, MQTT, OPC UA, SECS/GEM, Profinet, or any other protocol, to access data in real-time from disparate data sources 400. IO Managers 410 and 422 also enable two-way communication with controllers and actuators of the device 103 to send in commands and instructions for alert management. IO Managers 410 and 422 communicate with disparate data sources 400 directly via any communication network 430, such as Ethernet, Wi-Fi, Universal Serial Bus (USB), ZIG-BEE, Cellular or 5G connectivity, etc., or indirectly through a device's Process Control Master (PCM), through a Programmable Logic Controller (PLC) or through a Data Acquisition System (DAQ), or any other such mechanism.

Alert Managers 422 also enable two-way communication with the one or more processors 416 and display 428 to communicate alerts, alert priority, alert classification, alert handling instructions, alert impact, etc.

Edge compute engine 401 also comprises a Data Quality of Service (QOS) and Data Management module 412 which is a set of computer instructions that run on the one or more processors 416. This Data Management module 412 ensures quality of data, for example, the Data Management module 412 may flag, or notify about missing data, and can quantify the performance of a data stream in real-time. For any machine learning algorithm, quality data is of utmost importance. The Data Management module 412 ensures quality of data input.

Edge compute engine 401 also comprises one or more validator modules 420. The one or more validator modules 420 are a set of computer instructions that run on the one or more processors 416. Proper validation may be done on the inferenced parameters and the alerts by the one or more validator modules 420 before sending the alert to make sure desired improvements may be achieved, device parts or process may not be affected, the values of operation parameters may remain within proper thresholds and tracked matrix may show improvements. The one or more validator modules 420 ensure improvements in device uptime, UPH, Yield, cost of operation, spare parts usage, cycle time improvements and Overall Equipment Effectiveness (OEE) improvements for all alert actions.

In accordance with one embodiment, device sensor data from the internal sensors 402, such as motion, axis position, acceleration, rotation, tilt, temperature, vibrations, humidity, etc.; external sensor data that supplements the device sensor data and is collected by installing external sensors 404 on the device 103; image data such as component cracks, placement, operator action, etc.; context data 406, such as the device 103 functioning state, errors, testing data, parts inventory, age and wear on the parts, material details, preventive maintenance schedule, orders and delivery schedules, operator capabilities and other such data that forms the background information that provides a broader understanding of an event, person, or component; and environmental data 408 such as changes surrounding the device 103, such as a fan being on near the device 103, the device 103 being close to a heat source, the device 103 being close to a vibration source, humidity, etc.; changes in dynamics of the device 103, age and wear of device parts; structural damages, and changes in material, all these disparate data sources 400 are accessed in real-time either through an event based mechanism, such as a pub-sub mechanism where any sensor or state change is notified to the listeners, or through a ultra-low latency time triggered mechanism where correlated data is fetched at periodic time triggers, optimized to fetch data as it changes. The data is fetched in real-time by the IO Managers 410 and 422 through various protocols, such as UDP from disparate data sources 400. Data QOS and Data management module 412 performs data QOS on input data and any missing data may be flagged. Data or features in desired state are then presented in memory to the one or more processors 416 that hosts the trained machine learning models.

Computer instruction sets and algorithms for time triggering, learning, anomaly detection, predictive analysis, root causing as well as alert management are executed on the one or more processors 416 with input from memory 414. Network 430 may be used to transfer data for training to a remote computer 124 (as shown in FIG. 1). Network 430 may also be used to deploy trained machine learning models and associated computer instruction sets on to the one or more processors 416. The machine learning model training may happen at the edge device 100 on the one or more processors 416 (as per the embodiment of the present disclosure depicted in FIG. 2), close to the data source, in the cloud, or on any remote computer.

In an embodiment of the present disclosure, data from disparate input sources 400 is fed in memory 414 and then to a machine learning runtime engine running on the one or more processors 416 close to the disparate input sources 400 in order to get low latency inferencing. In certain embodiments, inferencing from machine learning models happens in real-time at ultra-low frequency of 5 to 30 ms. Machine learning inferences, results and predictions are also stored in memory 418 for faster access. In certain embodiments, the inferences and results from machine learning algorithms are validated in one or more validation modules 420 for proper behavior and improvements. Further, feedback as alerts through the Alerts Manager 422, for example, is sent to the controller of the device 103 through the IO Manager 422, for example through a UDP IO Manager. The alerts are then transported over a communication network, such as USB, directly or indirectly through the processing system 112 for display on the alert display 424. Alert acknowledgement, reactions and complete life cycle details are feedback to the one or more processors 416 to manage the alert, escalate further if needed, validate fixes or do issue further alerts. This helps to achieve improvements in safety, environmental concerns, equipment uptime, UPH, Yield, cost of operation, spare parts usage, cycle time improvements and Overall Equipment Effectiveness (OEE) improvements. In parallel to the alert management loop, data and results may be stored in the storage unit 426, such as a database and displayed on the display 428 via a user interface.

In one embodiment relevant data from disparate data sources 400 is accessed in real time through respective IO Managers 410. The relevant data is then fed in memory 414 to the machine learning runtime engine running on the one or more processors 416. The relevant sensor, contextual, environmental, and other important data is presented to a trained anomaly detection module having machine learning models represented as executable instructions running on the one or more processors 416, for ultra-low latency inferencing. The machine learning models are trained to find anomalies that are defined as deviations from standard, normal or baseline behavior. The training of the machine learning models for anomaly detection may happen at the edge, or at any remote computer. The data for training may be any relevant historic data or may be insights from a subject matter expert or any other information that may add intelligence to the model. In one embodiment, the performance of the trained machine learning models to infer proper anomalies is quantified, and if the performance drops below a threshold, the machine learning models may be retrained on fresh data. In an embodiment, the inferencing is reactive and upon seeing anomalies is real-time, alerts are issued in ultra-low frequency. In another embodiment, the inferencing and training of the machine learning models is to proactively predict events from happening and issue alerts much in advance of the event. In an embodiment, alerting is based on data-driven anomaly detection and counting the frequencies of those anomaly over a specific time period. The computed frequency may be compared to limits set by static or dynamic business rules and alerts are generated. The alerts are then transported over communication network, such as USB, directly or indirectly through the processing system 112 for display on the alert display 424.

In an embodiment, model training as well as inferencing of alerts is based on time-series data. Time series data is a collection of observations obtained through repeated measurements over time. In an embodiment, anomaly detection over the time series data may be achieved through Predictive Confidence Level Approach wherein, a predictive model is built using the historical data to estimate and get a sense of the overall common trend, seasonal or cyclic pattern of the time series data. Using the predictive model to forecast future values and based on the error rates (which may be calculated using Mean Absolute Percentage Error (MAPE), a confidence interval, or a confidence band for the predicted values may be computed. Any actual data point which may fall beyond this confidence band may be categorized as an anomaly and may trigger an alert. In another embodiment, distance-based clustering mechanisms may be used for anomaly detection. The training data may consist of one or more data streams from the device e.g., axis motion, drive current, optical power, etc. Statistical features may be extracted from these data streams and then specific distance metric may be used to cluster the data points. Multiple iterations over the data points build the model with a set of clusters having various centroids and areas of influence (based on the chosen distance metric). Those data points which fall outside of all trained cluster may then be classified as 'anomaly' and may trigger the alerts. In other embodiments, other mechanisms such as Gaussian Mixture Machine Learning, Radial basis function with neuron activation and area of influence, Hierarchical agglomerative clustering where discretized data points may be classified, belonging to different categories of physical variables and where data points (or a combination thereof) which fall outside all clusters, may be considered anomalous, and other such machine learning algorithms may be used for anomaly detection.

In one embodiment, the relevant sensor, contextual, environmental, historic alert impact data, historic downtime data, safety data, environmental data, or any such relevant data which help prioritize an alert is used to categorize and prioritize the alert and this learning is represented in machine learning models represented as executable instructions running on the one or more processors 416, for ultra-low latency alarm flood detection. In one embodiment, based on historic learnings, subject matter expert inputs, operator, technician and process engineer inputs, business, safety, environment, or plant performance impact, and based on the rules set, only highest priority and most important alerts may be filtered out in real time by the one or more processors 416 and the same may be presented on the alert display 424. This just highlights the most important alerts and hides the flood of alarms and makes sure that a critical safety alarm issued during the alarm flood, is not missed. In one embodiment, if after an alarm is presented to the operator on the alert display 424 and another more critical alarm is detected, the more critical alarm with a higher priority and higher impact may get presidency and may replace the less critical alarm, thus allowing the operator to address the most critical issue at hand. In one embodiment, the alarm management system controls alarm floods under all operating conditions. Machine learning models categorize, filter out and prioritize the most important alarms, in real time, with significant safety, environmental or business impact and present those selected alarms to the operator. In another embodiment, grouping, suppressing, and batch processing of alarms, preferably using machine learning and in real-time, at the edge, close to the source of data are accomplished through executable instructions running on the one or more processors 416.

In one embodiment, trained machine learning models represented as executable instructions running on the one or more processors 416 categorize the alert that has been identified by the said anomaly detection machine learning model running in the anomaly detection module of the one or more processors 216. In one embodiment categorization may be on criticality, such as critical, normal, low priority, etc., or categorization may be by issue type, such as, safety, environmental, operational, business, equipment, etc., or it may be any other categorization. In one embodiment, the training of the said categorization models may be a standard classification task and the training data may consist of the statistical pattern of the specific data stream that leads to the alert on the platform. Training data points may be collected over time through direct operator/engineer feedback and the classification model may be updated on a periodic basis. In one embodiment, either the raw time series data or the statistical features extracted from the data streams may be used as the input features. In one embodiment, decision tree/random forest algorithms with statistical extracts of the entire time series data may be used for training and inference. In yet another embodiment, any of the following algorithms may be use for categorization, logistic regression with statistical extracts of the entire time series data, multilayer perceptron with statistical extracts of the entire time series data, K-Nearest neighbors with dynamic time warping, time series forest classifier with random intervals' statistics, and so on. In one embodiment, the categorization of the alert may be presented along with the alert to the operator, to improve the impact of the alert. In one embodiment, the categorization of the alerts may be used to pick proper escalation path for the alert.

In one embodiment, trained machine learning models represented as executable instructions running on the one or more processors 416 prioritize the alert that has been identified in ultra-low latency. The algorithms for the machine learning models may be like the algorithms used for categorization or could be any other suitable algorithm. The data for training the said prioritization models may be historic alert impact data, historic downtime data, safety data, environmental data, operator feedback, technician fed back, part cost, business impact, order delivery impact, safety impact, environment impact, or any relevant data. Based on one or more of these criteria's, the machine learning model sets the priority of the alert. In one embodiment, the priority of the alert is presented along with the alert to the operator, to improve the impact of the alert. In another embodiment, the priority of the alerts is used to filter out most important alerts from the flood of alerts and present it to the operator on alert display 424. In one embodiment, the priority of the alerts is used to pick proper escalation path for the alert.

In one embodiment, trained machine learning models represented as executable instructions running on the one or more processors 416 are used to manage the complete life cycle of an alert form initiation to termination. Alerts inferred by the models or by any algorithm, may be presented to the operator on the alert display 224. The alerts may be visual or sound based alerts on the operator dashboard, or it could be local or remote SMS, email, phone call, voice mail, collaboration channel message, such as Slack or Teams message, social network message, such as WhatsApp or Facebook message, radio message, pager message, or any other type of effective notification message. In certain embodiments the alert message may be sent to one or more person or a group or to a chain of personal, depending on the importance of the alert. In one embodiment, the reaction time of the operator to acknowledge the alert and time to address the alert or time to summon a technician or time for technician to start the work or time for technician to schedule the fix or time when the issue associated with the alert is resolved, and all such information associated with the life cycle of the alert is tracked as alert monitoring data 409 and communicated via a suitable communication network, such as UDP to Memory 414, and presented to the various modules in the one or more processors 416 where further actions related to the life cycle management of the alerts may be executed. In one embodiment, life cycle management includes tracking reaction time and comparing it to ideal reaction time, tracking efficiency of the operator and the technician, tracking impact via parts and downtime, real-time automatic alarm escalation if alerts may not be acted upon in desired time frame or based on impact, repeat counts and reminder, and message delays, alarm propagation to proper personnel, and so on. In one embodiment, when an alarm or event takes place, instructions for alert life cycle management may automatically escalate the alert through a pre-defined hierarchy until it is acknowledged. In yet another embodiment pre-defined or learnt escalation schemes may be used to manage the escalation. In one embodiment, based on the skills of a technician and history of handling similar alerts and based on the criticality of the alert, said alerts can be routed to the best technician for the job.

In one embodiment, alert life cycle management machine learning models use classification algorithms such as Random Forest or K-nearest neighbor to predict which type of alert is most likely to occur next based on the recent history of process data. Recurrent neural networks (RNN) with Long Short-Term Memory (LSTM)/Gated Recurrent Unit (GRU) may also be used to predict the probability of the next alert. In another embodiment, alert recommendation system is used to cater to a multitude of persona, the alerting system may also employ a machine leaning based recommender system which learns the preferences of various stakeholders over time with respect to alerts that is which set of specific alerts provide them with maximum utility. This implementation may have the potential of making the alerting system highly personalized and role-specific.

In one embodiment, similar alerts may be grouped together by executable instructions running on the one or more processors 416 and represented as a single alert. In another embodiment, alerts may be grouped based on the personal preference of the person receiving the alert. In yet another instance alerts may be grouped together by priority, category, or actor, or any relevant criteria. In one embodiment, certain low priority alerts may be grouped and suppressed together. In one embodiment grouped alerts may be batch processed together.

In an embodiment, the alert message may be sent to one or more person or a group or to a chain of personal, depending on the importance of the alert. In certain embodiments the machine learning algorithms and associated alerts may be set with personnel protection, safety, product quality, environmental issues, regulations, improvements in equipment uptime, Units Per Hour (UPH) of modules produced, yield of production, cost of operation, spare parts usage, cycle time improvements or Overall Equipment Effectiveness (OEE) improvements or company or site policies in focus. Further embodiments may allow ultra-low latency inferencing on the one or more processors 416 and alerting based on correlated sensor, contextual, business, environmental or any relevant data, wherein, the alerts are based on Key Performance Indicators (KPIs) of interest to the business, such as Units per Hour (UPH), Yield, Downtime, Overall Equipment Effectiveness (OEE), or any such parameter of interest.

In one embodiment, machine learning models running on the one or more processors 416 may be used for predictions and anomaly detection to issue effective alerts to proper targeted personal, with proper optimized Out of Control Action Plans (OCAPs) instructions alongside the alert. In one embodiment, the OCAP instructions may be personalized for the person presented with the alert. For instance, alerts presented to the operator of the device 103 may be presented as instructions for the operator. Alerts presented to a technician have technician specific instructions on how to act on the alert. In one embodiment, if targeted personal figures out a better way to address the alert, the system learns this new optimized way and improves the OCAP accordingly with this best practice for handling next similar alert. In yet another embodiment, proper machine learning based algorithms and learnings from SMEs may be used to set up OCAP instructions, based on business impacts of the alerts. In one embodiment, business impact, safety impact, environmental impact, OEE impact, yield impact, downtime impact and so on may be presented alongside the alert to improve the impact and reaction time on critical alerts. In another embodiment, machine learning algorithms may be used to optimize OCAP steps for an alert resolution based on learnings from the shortest path taken by an operator or technician to resolve the alert and updating OCAPs throughout the site and even across sites to enforce the new best practice learned from the field. In yet another embodiment agile improvement to the alerts are enabled based on collaboration and feedback from operators, technicians, Subject Matter Experts (SMEs), or any correlating source to improve the effectiveness of alerts.

In one embodiment, machine learning models running on the one or more processors 416 are used for quantification of impact of an alert. In one embodiment, impact prediction such as cost and OEE impact of alerts and process disruptions resulting from ignoring those alerts, such as, machine downtime and unplanned maintenance may be predicted based on machine learning algorithms such as multinomial regression in the prediction analysis module of the one or more processors 416. However, this kind of prediction problem is unique in the sense that many of the predictor variables may be categorical in nature and not numeric. In one embodiment, decision tree regression where multiple regression functions sit on the leaf of a decision tree and get picked up depending on the set of pertinent categorical variables such as machine state, and product type that are used. In one embodiment, the training data for impact quantification machine learning models may be historic alert impact data, historic downtime data, safety data, environmental data, operator feedback, technician feedback, part cost, business impact, order delivery impact, safety impact, environment impact, or any relevant data. In one embodiment, quantification of impact of an alert is presented to the personnel alongside the alert to improve the effectiveness of the alert and improve the response time for a high impact alert. In another embodiment, machine learning algorithms may be used to quantify the impacts of an alert based on contextual intelligence and adjust the prioritization, characterization, escalation, and life cycle management of the alert based on the determined quantification and associated business impact.

In accordance with another embodiment, edge inferencing for alerts on the one or more processors 416, from disparate input data sources 400 is done in real time without a machine learning model and without any training of the model or with un-supervised training, based on simple rules or algorithms derived from experience of Subject Matter Experts (SMEs). The inferences are then fed back to alerting mechanism on the third-party device so the alerts are very close to the operator and on the user interface that is quite familiar to the operator. In one aspect of the embodiment, context information that forms the background information that provides a broader understanding of the whole process, the device, its operation, or the events, as well as environmental changes surrounding an equipment are correlated and stitched together with the sensor data to create context-aware data for inference, alerting, and root causing.

In accordance with another embodiment, machine learning algorithms are used not only for intelligent and automated edge alert life cycle management but also for intelligent work permit management associated with resolving the alert, with proper notifications and details needed for approvals from appropriate personals to perform the tasks at hand defined in the OCAP for the alert. The work permit management executable instructions running on the one or more processors 416 issue requests in proper mechanism, such as email, to appropriate personnel to authorize the task needed to be completed for addressing the alert.

Further embodiments allow machine learning based Quality of Service (QOS) determination of the alert as well as of the QOS determination of the resolution of the alert. Yet another embodiment covers assigning a quantification or score to the effectiveness and importance of an alert as well as to determine how the alert was acted on, thus, making it easy to escalate and improve handling of the alert.

Further embodiments may allow ultra-low latency alerts on alert display 424 with an option displayed to fix the underlying issue automatically through feed-back adaptive control. Yet another embodiment allows use of machine learning to categorize and mark the alert likewise and encourage the operator to operate in Fail Operational state or a degraded state and keep manufacturing parts, thus increasing the UPH. In one embodiment, the machine learning models running on the one or more processors 416 learn as new data and insights come on and improve the instructions to present even more effective alerts.

In one embodiment, alert escalation machine learning models utilize the cost/OEE quantification models and assign priority to the matter of escalation. In another embodiment, alert priority classification may be done with machine learning algorithms such as deep neural networks or support vector machines and top-ranked alerts may be chosen to put into the pipeline of escalation. In one embodiment, the escalation chain may, for example, be Operator→Technician→Contract Manufacturers Engineer→Process Engineer→Site Supervisor→Industrial Engineering Manager→Division Head.

Figure 5:
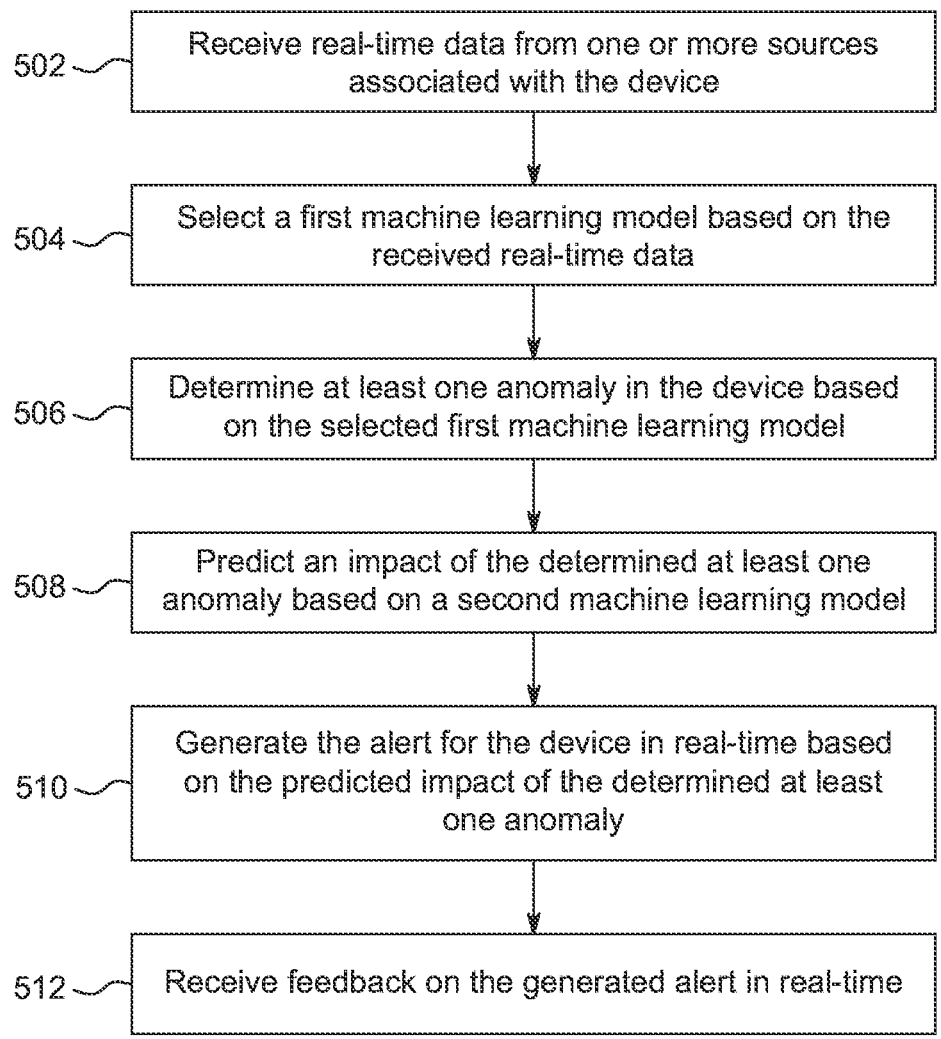
FIG. 5 illustrates a flowchart for real-time intelligent and automated alert lifecycle management using machine learning in accordance with an embodiment of the disclosure.

FIG. 5 illustrates a flowchart for real-time intelligent and automated alert lifecycle management using machine learning in accordance with an embodiment of the disclosure. The method, at step 502, describes that real-time data for one or more parameters of the device 103 for which an alert is to be generated is received (by the external computer 115 as described in the embodiment of FIG. 1 or is received by the internal computer 112 as described in the embodiment of FIG. 2) from one or more sources 400 associated with the device 103. At step 504, the method describes that a first machine learning model from a plurality of machine learning models is selected based on the received real-time data (by the external computer 115 as described in the embodiment of FIG. 1 or by the internal computer 112 as described in the embodiment of FIG. 2). Further, the flowchart of FIG. 5, at step 506, describes that at least one anomaly in the device 103 is determined based on the selected first machine learning model, and at step 508, describes that an impact of the determined at least one anomaly is predicted based on a second machine learning model of the plurality of machine learning models (by the external computer 115 as described in the embodiment of FIG. 1 or by the internal computer 112 as described in the embodiment of FIG. 2).

Furthermore, the flowchart of FIG. 5, at step 510, describes that the alert for the device in real-time is generated based on the predicted impact of the determined at least one anomaly, and at step 512, describes that feedback on the generated alert in real-time is received (by the external computer 115 as described in the embodiment of FIG. 1 or by the internal computer 112 as described in the embodiment of FIG. 2). Further, the first machine learning model and the second machine learning model are trained in real-time based on the received feedback.

Figure 6:
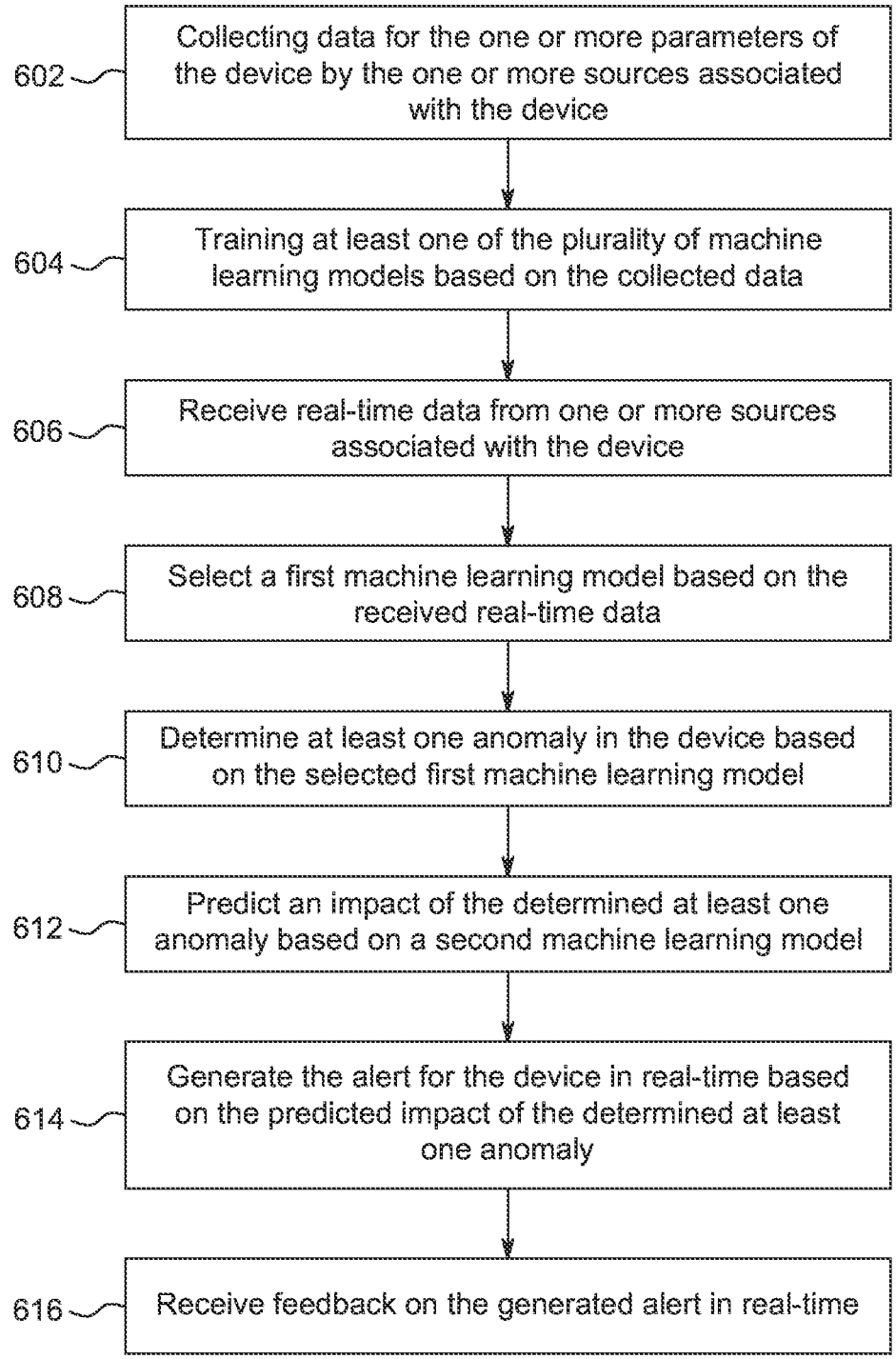
FIG. 6 illustrates a flowchart for training a machine learning model for real-time intelligent and automated alert lifecycle management using the machine learning model in accordance with an embodiment of the disclosure.

FIG. 6 illustrates a flowchart for training a machine learning model for real-time intelligent and automated alert lifecycle management using the machine learning model in accordance with an embodiment of the disclosure.

The flowchart of FIG. 6 describes a method for managing real-time alerts using machine learning. The method, at step 602, describes that data for the one or more parameters of the device 103 is collected by the one or more sources 400 associated with the device 103. At step 604, the method described by the flowchart of FIG. 6, describes that at least one of a plurality of machine learning models is trained by the remote computer 124 based on the collected data for the one or more parameters of the device 103.

Further, the flowchart of FIG. 6, at steps 606-616 describes steps that are similar to the steps 502-512 of FIG. 5. Thus, the detailed description of steps 606-616 is omitted for the brevity of this disclosure.

The advantage of the disclosed solution is that the external computer 115 uses the needed sensor and context data from internal memory, so that there is no lag or time wasted in making a database or any other TCP connection. This is critical for ultra-low latency inferencing. The disclosed method provides a predictive, ultra-low latency, edge, anomaly detection and alarm management system that learns and self corrects and presents effective alarms. The present disclosure also uses machine learning to categorize, filter out and prioritize the most important alarms, in real time, with significant safety, environmental or business impact and present those selected alarms to the operator. The disclosed system further describes grouping, suppressing, and batch processing of alarms, using machine learning and in real-time, at the edge, close to the source of data.

In accordance with the embodiments of the present disclosure, the predictions and anomaly detection from machine learning models to issue effective alerts to proper personal, with proper Out of Control Action Plans (OCAPs) and proper machine learning based escalation of alerts, up the chain, based on business impacts of the alerts is described. The disclosed method also describes machine learning based life cycle management of alerts, with proper capture and enforcements of response time at each stage, learning constantly about best practices to handle the alert, and enforcing the best practices for the said alerts.

In an embodiment of the present disclosure, the disclosed method correlates and analyzes contextual, business, or other surrounding environmental information in conjunction with the said monitored parameters and use machine learning algorithms to do real time inferences at the edge to make the alerts intelligent, effective, and optimized for Key Performance Indicators (KPIs) of interest to the business, such as Units per Hour (UPH), Yield, Downtime, Overall Equipment Effectiveness (OEE), or any such parameter of interest. The disclosed method further quantifies the impacts of an alert based on contextual intelligence and adjusts the prioritization, characterization, escalation, and life cycle management of the alert based on the determined business impact. Further, the disclosed method associates and communicates the business impact along with the alert, to make it effective.

The disclosed methods may be performed by processing logic that may include hardware (circuitry, dedicated logic, etc.), software (such as run on a general-purpose computer system or a dedicated machine), or a combination of both. The processing logic may be included in any node or device (e.g., edge device 100, device 103 etc.), or any other computing system or device. A person with ordinary skill in the art will appreciate that the disclosed method is capable of being stored on an article of manufacture, such as a non-transitory computer-readable medium. In an embodiment, the article of manufacture may encompass a computer program accessible from a storage media or any computer-readable device.

In accordance with the embodiments of this disclosure, a method is disclosed. The method includes managing real-time alerts using machine learning are disclosed. The method includes receiving real-time data for one or more parameters of a device for which an alert is to be generated, from one or more sources associated with the device, and selecting a first machine learning model from a plurality of machine learning models based on the received real-time data. The method further includes determining at least one anomaly in the device based on the selected first machine learning model and predicting an impact of the determined at least one anomaly based on a second machine learning model of the plurality of machine learning models. Furthermore, the method includes generating the alert for the device in real-time based on the predicted impact of the determined at least one anomaly and receiving feedback on the generated alert in real-time. The first machine learning model and the second machine learning model are trained in real-time based on the received feedback.

In accordance with the embodiments of this disclosure, the method further comprises collecting data for the one or more parameters of the device by the one or more sources associated with the device, and training at least one of the plurality of machine learning models based on the collected data for the one or more parameters of the device.

In accordance with the embodiments of this disclosure, training the at least one of the plurality of machine learning models comprises training the at least one of the plurality of machine learning models at one or more of: an edge of the device, close to a source of the one or more sources of the device, in the cloud, or on a remote computer.

In accordance with the embodiments of this disclosure, the method further comprises generating an Out of Control Action Plans (OCAPs) on an escalation chain of the determined at least one anomaly.

In accordance with the embodiments of this disclosure, receiving the feedback on the generated alert in real-time comprises learning a new OCAP for a future alert based at least on real-time handling of the generated alert, and wherein the future alert is same as the generated alert.

In accordance with the embodiments of this disclosure, the method further comprises categorizing the generated alert in real-time based on the predicted impact of the determined at least one anomaly and processing the categorized alert in real-time based on a priority level of a respective category of the categorized alert.

In accordance with the embodiments of this disclosure, the method further comprises operating the device in a first state when the priority level of the respective category of the categorized alert is a first priority level, wherein the first state is a self-stopping state of the device, and operating the device in a second state when the priority level of the respective category of the categorized alert is a second priority level, wherein the second state is a slowing down state of the device.

In accordance with the embodiments of this disclosure, the first priority level is higher than the second priority level.

In accordance with the embodiments of this disclosure, the real-time data comprises one or more of: sensor data from at least one sensor located inside the device, sensor data from at least one sensor located outside the device, context data, changes in dynamics of the device, alert monitoring data, and environmental data surrounding the device.

In accordance with the embodiments of this disclosure, the context data comprises one or more of: functioning state and errors in device functioning, inventory and age of device parts, wear and tear of the device parts, details of device material, preventive maintenance schedule, orders and delivery schedules, history of degraded device state, and operator parameters.

In accordance with the embodiments of this disclosure, receiving the real-time data for the one or more parameters of the device comprises correlating two or more of: the sensor data from the at least one sensor located inside the device, the sensor data from the at least one sensor located outside the device, the context data, the changes in the dynamics of the device, the alert monitoring data, and the environmental data surrounding the device to form context-aware data.

In accordance with the embodiments of this disclosure, the method further comprises quantifying the impact of the determined at least one anomaly based on the real-time data, categorizing the generated alert in real-time based on the quantified impact of the determined at least one anomaly, and processing the categorized alert in real-time based on a priority level of a respective category of the categorized alert.

In accordance with the embodiments of this disclosure, processing the categorized alert in real-time comprises suppressing the categorized alert in real-time based at least on the priority level, or presenting the categorized alert in real-time on an operator device based at least on the priority level.

In accordance with the embodiments of this disclosure, generating the alert for the device in real-time comprises generating the alert for the device to an operator in accordance with an escalation chain of the determined at least one anomaly, and wherein the escalation chain of the determined at least one anomaly is based at least on the predicted impact of the determined at least one anomaly and the priority level.

In accordance with the embodiments of this disclosure, the impact is one or more of: a business impact, a safety impact, and an environmental impact.

In accordance with the embodiments of this disclosure, the generated alert comprises one or more of: a visual alert, a sound alert, a message, an email, a phone call, a voice mail, a collaboration channel message, a social network message, a radio message, and a pager message.

In accordance with the embodiments of this disclosure the generated alert is sent to one or more of: persons, a group of persons, or a chain of personnel, based at least on an importance of the generated alert.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The present disclosure has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the SP network architecture described herein contain optional features that can be individually or together applied to any other embodiment shown or contemplated here to be mixed and matched with the features of that architecture.

While the invention has been described with respect to a limited number of embodiments, those skilled in the art, having benefit of this disclosure, will appreciate that other embodiments can be devised which do not depart from the scope of the invention as disclosed herein.

We claim:

1. A method for managing real-time alerts using machine learning, the method comprising:
   receiving real-time data for one or more parameters of a device for which an alert is to be generated, from one or more sources associated with the device;
   selecting a first machine learning model from a plurality of machine learning models based on the received real-time data;
   determining at least one anomaly in the device based on the selected first machine learning model;
   predicting an impact of the determined at least one anomaly based on a second machine learning model of the plurality of machine learning models;
   generating the alert for the device in real-time based on the predicted impact of the determined at least one anomaly; and
   receiving feedback on the generated alert in real-time, wherein the first machine learning model and the second machine learning model are trained in real-time based on the received feedback.

2. The method of claim 1, further comprising:
   collecting data for the one or more parameters of the device by the one or more sources associated with the device; and
   training at least one of the plurality of machine learning models based on the collected data for the one or more parameters of the device.

3. The method of claim 2, wherein the training comprises training the at least one of the plurality of machine learning models at one or more of: an edge of the device, close to a source of the one or more sources associated with the device, in the cloud, or on a remote computer.

4. The method of claim 1, further comprising generating Out of Control Action Plans (OCAPs) on an escalation chain of the determined at least one anomaly.

5. The method of claim 4, wherein receiving the feedback on the generated alert in real-time comprises learning a new OCAP for a future alert based at least on real-time handling of the generated alert, and wherein the future alert is same as the generated alert.

6. The method of claim 1, further comprising:
   categorizing the generated alert in real-time based on the predicted impact of the determined at least one anomaly; and
   processing the categorized alert in real-time based on a priority level of a respective category of the categorized alert.

7. The method of claim 6, further comprising:
   operating the device in a first state when the priority level of the respective category of the categorized alert is a first priority level, wherein the first state is a self-stopping state of the device; and
   operating the device in a second state when the priority level of the respective category of the categorized alert is a second priority level, wherein the second state is a slowing down state of the device.

8. The method of claim 7, wherein the first priority level is higher than the second priority level.

9. The method of claim 1, wherein the real-time data comprises one or more of: sensor data from at least one sensor located inside the device, sensor data from at least one sensor located outside the device, context data, changes in dynamics of the device, alert monitoring data, and environmental data surrounding the device.

10. The method of claim 9, wherein the context data comprises one or more of: functioning state and errors in device functioning, inventory and age of device parts, wear and tear of the device parts, details of device material, preventive maintenance schedule, orders and delivery schedules, history of degraded device state, and operator parameters.

11. The method of claim 10, wherein receiving the real-time data for the one or more parameters of the device comprises:
   correlating two or more of: the sensor data from the at least one sensor located inside the device, the sensor data from the at least one sensor located outside the device, the context data, the changes in the dynamics of the device, the alert monitoring data, and the environmental data surrounding the device, to form context-aware data.

12. The method of claim 1, further comprising:
quantifying the impact of the determined at least one anomaly based on the real-time data;
categorizing the generated alert in real-time based on the quantified impact of the determined at least one anomaly; and
processing the categorized alert in real-time based on a priority level of a respective category of the categorized alert.

13. The method of claim 12, wherein processing the categorized alert in real-time comprises:
suppressing the categorized alert in real-time based at least on the priority level; or
presenting the categorized alert in real-time on an operator device based at least on the priority level.

14. The method of claim 12, wherein generating the alert for the device in real-time comprises generating the alert for the device for an operator in accordance with an escalation chain of the determined at least one anomaly, wherein the escalation chain of the determined at least one anomaly is based at least on the predicted impact of the determined at least one anomaly and the priority level.

15. The method of claim 1, wherein the impact is one or more of: a business impact, a safety impact, and an environmental impact.

16. The method of claim 1, wherein the generated alert comprises one or more of: a visual alert, a sound alert, a message, an email, a phone call, a voice mail, a collaboration channel message, a social network message, a radio message, and a pager message.

17. The method of claim 1, wherein the generated alert is sent to one or more of: persons, a group of persons, or a chain of personnel, based at least on an importance of the generated alert.

18. A system to manage real-time alerts using machine learning, the system comprising:
a computing device configured to:
receive real-time data for one or more parameters of a device for which an alert is to be generated, from one or more sources associated with the device;
select a first machine learning model from a plurality of machine learning models based on the received real-time data;
determine at least one anomaly in the device based on the selected first machine learning model;
predict an impact of the determined at least one anomaly based on a second machine learning model of the plurality of machine learning models;
generate the alert for the device in real-time based on the predicted impact of the determined at least one anomaly; and
receive feedback on the generated alert in real-time, wherein the first machine learning model and the second machine learning model are trained in real-time based on the received feedback.

19. The system of claim 18, wherein the one or more sources associated with the device are configured to collect data for the one or more parameters of the device.

20. The system of claim 19, further comprising:
a remote computing device located remotely from the device and connected to the device via a communication network, wherein the remote computing device is configured to train at least one of the plurality of machine learning models based on the collected data for the one or more parameters of the device.

* * * * *